US012652088B2

(12) United States Patent　　(10) Patent No.:　US 12,652,088 B2
Liu　　(45) Date of Patent:　Jun. 9, 2026

(54) METHODS FOR SWITCHING ANTENNA SWITCHING CONFIGURATION, AND COMMUNICATION DEVICE

(71) Applicant: Beijing Xiaomi Mobile Software Co., Ltd., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 385 days.

(21) Appl. No.: 18/270,387

(22) PCT Filed: Dec. 29, 2020

(86) PCT No.: PCT/CN2020/140738
§ 371 (c)(1),
(2) Date: Jun. 29, 2023

(87) PCT Pub. No.: WO2022/141039
PCT Pub. Date: Jul. 7, 2022

(65) Prior Publication Data
US 2024/0106504 A1　Mar. 28, 2024

(51) Int. Cl.
*H04B 7/06*　(2006.01)
*H04L 5/00*　(2006.01)
(Continued)

(52) U.S. Cl.
CPC ......... *H04B 7/0608* (2013.01); *H04L 5/0051* (2013.01); *H04W 28/20* (2013.01);
(Continued)

(58) Field of Classification Search
CPC .. H04B 7/0608; H04L 5/0051; H04W 72/232; H04W 72/0453; H04W 28/20; H04W 36/06
(Continued)

(56) References Cited

U.S. PATENT DOCUMENTS 10,771,214 B2　9/2020　Zhang
10,938,529 B2　3/2021　Liu et al.
(Continued)

FOREIGN PATENT DOCUMENTS

CN　110034886 A　7/2019
CN　110650485 A　1/2020
CN　111713037 A　9/2020

OTHER PUBLICATIONS

Qualcomm Incorporated. "Discussion on SRS enhancement", 3GPP TSG-RAN WG1 Meeting #103-e, e-Meeting, Oct. 26-Nov. 13, 2020, R1-2009255, 31 pages. (Year: 2020).*
(Continued)

*Primary Examiner* — Kevin M Burd
(74) *Attorney, Agent, or Firm* — Volpe Koenig

(57) ABSTRACT

A Method for switching an antenna switching configuration, includes: according to a target antenna switching configuration to which a terminal device is to switch on a current bandwidth part (BWP), a network device sending to the terminal device indication information for activating a corresponding target sounding reference signal (SRS) resource configuration, so that after receiving the indication information of the target SRS configuration, which is sent by the network device, the terminal device switches to the corresponding target antenna switching configuration on the current BWP according to the indication information of the target SRS configuration.

14 Claims, 7 Drawing Sheets

(51) Int. Cl.
    *H04W 28/20*     (2009.01)
    *H04W 36/06*     (2009.01)
    *H04W 72/0453*     (2023.01)
    *H04W 72/232*     (2023.01)

(52) U.S. Cl.
    CPC ....... *H04W 36/06* (2013.01); *H04W 72/0453*
              (2013.01); *H04W 72/232* (2023.01)

(58) Field of Classification Search
    USPC ........................................................ 375/262
    See application file for complete search history.

(56)               References Cited

U.S. PATENT DOCUMENTS

| | | |
|---|---|---|
| 2019/0190669 A1 | 6/2019 | Park et al. |
| 2019/0253214 A1* | 8/2019 | Liu ..................... H04B 7/0413 |
| 2020/0252241 A1 | 8/2020 | Park et al. |
| 2022/0123799 A1* | 4/2022 | Varatharaajan ....... H04L 5/0048 |

OTHER PUBLICATIONS

ISA State Intellectual Property Office of the People's Republic of China, International Search Report Issued in Application No. PCT/CN2020/140738, Sep. 10, 2021, WIPO, 4 pages.
European Patent Office, Extended European Search Report Issued in Application No. 20967388.8, Feb. 7, 2024, Germany, 9 pages.
Qualcomm Incorporated: "Discussion on SRS enhancement",3GPP TSG-RAN WG1 Meeting #103-e, e-Meeting, Oct. 26-Nov. 13, 2020, R1-2009255, 31 pages.
ISA State Intellectual Property Office of the People's Republic of China, Written Opinion of the International Searching Authority Issued in Application No. PCT/CN2020/140738, Sep. 10, 2021, WIPO, 9 pages.

* cited by examiner

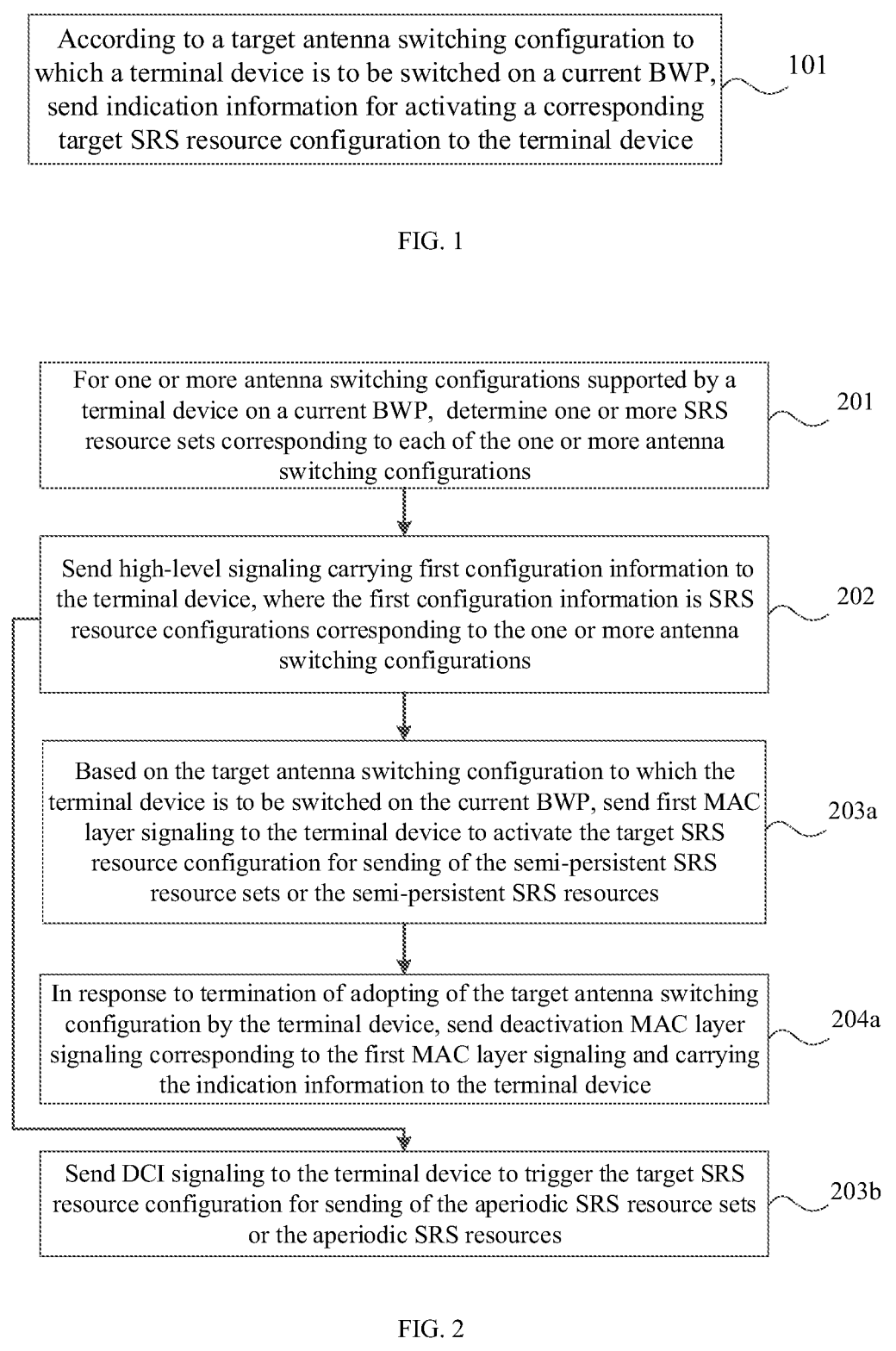

According to a target antenna switching configuration to which a terminal device is to be switched on a current BWP, send indication information for activating a corresponding target SRS resource configuration to the terminal device ⟋⟍ 101

FIG. 1

For one or more antenna switching configurations supported by a terminal device on a current BWP, determine one or more SRS resource sets corresponding to each of the one or more antenna switching configurations ⟋⟍ 201

Send high-level signaling carrying first configuration information to the terminal device, where the first configuration information is SRS resource configurations corresponding to the one or more antenna switching configurations ⟋⟍ 202

Based on the target antenna switching configuration to which the terminal device is to be switched on the current BWP, send first MAC layer signaling to the terminal device to activate the target SRS resource configuration for sending of the semi-persistent SRS resource sets or the semi-persistent SRS resources ⟋⟍ 203a In response to termination of adopting of the target antenna switching configuration by the terminal device, send deactivation MAC layer signaling corresponding to the first MAC layer signaling and carrying the indication information to the terminal device ⟋⟍ 204a Send DCI signaling to the terminal device to trigger the target SRS resource configuration for sending of the aperiodic SRS resource sets or the aperiodic SRS resources ⟋⟍ 203b

FIG. 2

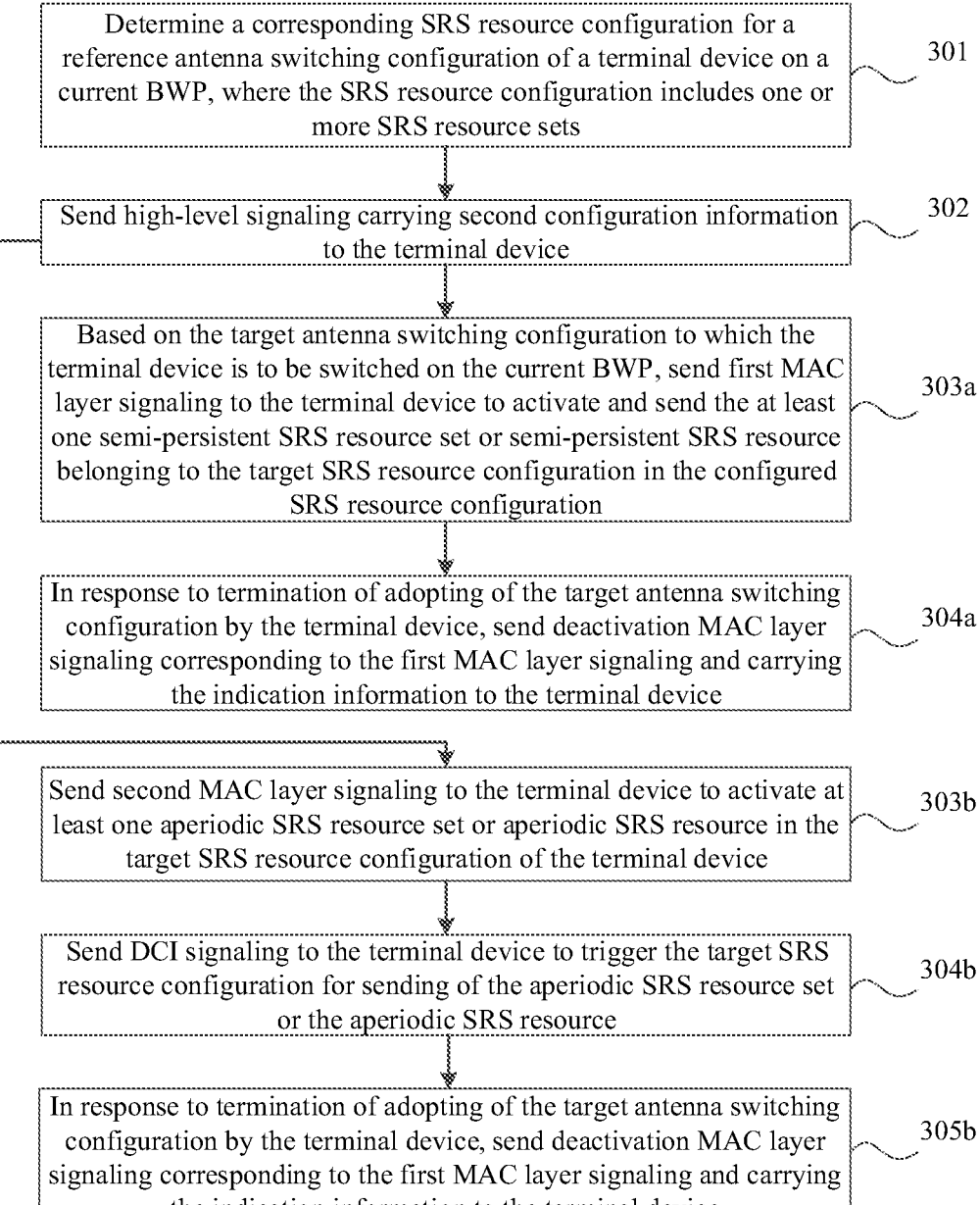

Determine a corresponding SRS resource configuration for a reference antenna switching configuration of a terminal device on a current BWP, where the SRS resource configuration includes one or more SRS resource sets ⟩ 301

Send high-level signaling carrying second configuration information to the terminal device ⟩ 302

Based on the target antenna switching configuration to which the terminal device is to be switched on the current BWP, send first MAC layer signaling to the terminal device to activate and send the at least one semi-persistent SRS resource set or semi-persistent SRS resource belonging to the target SRS resource configuration in the configured SRS resource configuration ⟩ 303a In response to termination of adopting of the target antenna switching configuration by the terminal device, send deactivation MAC layer signaling corresponding to the first MAC layer signaling and carrying the indication information to the terminal device ⟩ 304a Send second MAC layer signaling to the terminal device to activate at least one aperiodic SRS resource set or aperiodic SRS resource in the target SRS resource configuration of the terminal device ⟩ 303b Send DCI signaling to the terminal device to trigger the target SRS resource configuration for sending of the aperiodic SRS resource set or the aperiodic SRS resource ⟩ 304b In response to termination of adopting of the target antenna switching configuration by the terminal device, send deactivation MAC layer signaling corresponding to the first MAC layer signaling and carrying the indication information to the terminal device ⟩ 305b

FIG. 3

Receive indication information of a target SRS resource configuration sent by a network device  401

According to the indication information of the target SRS resource configuration, switch to a corresponding target antenna switching configuration on a current BWP  402

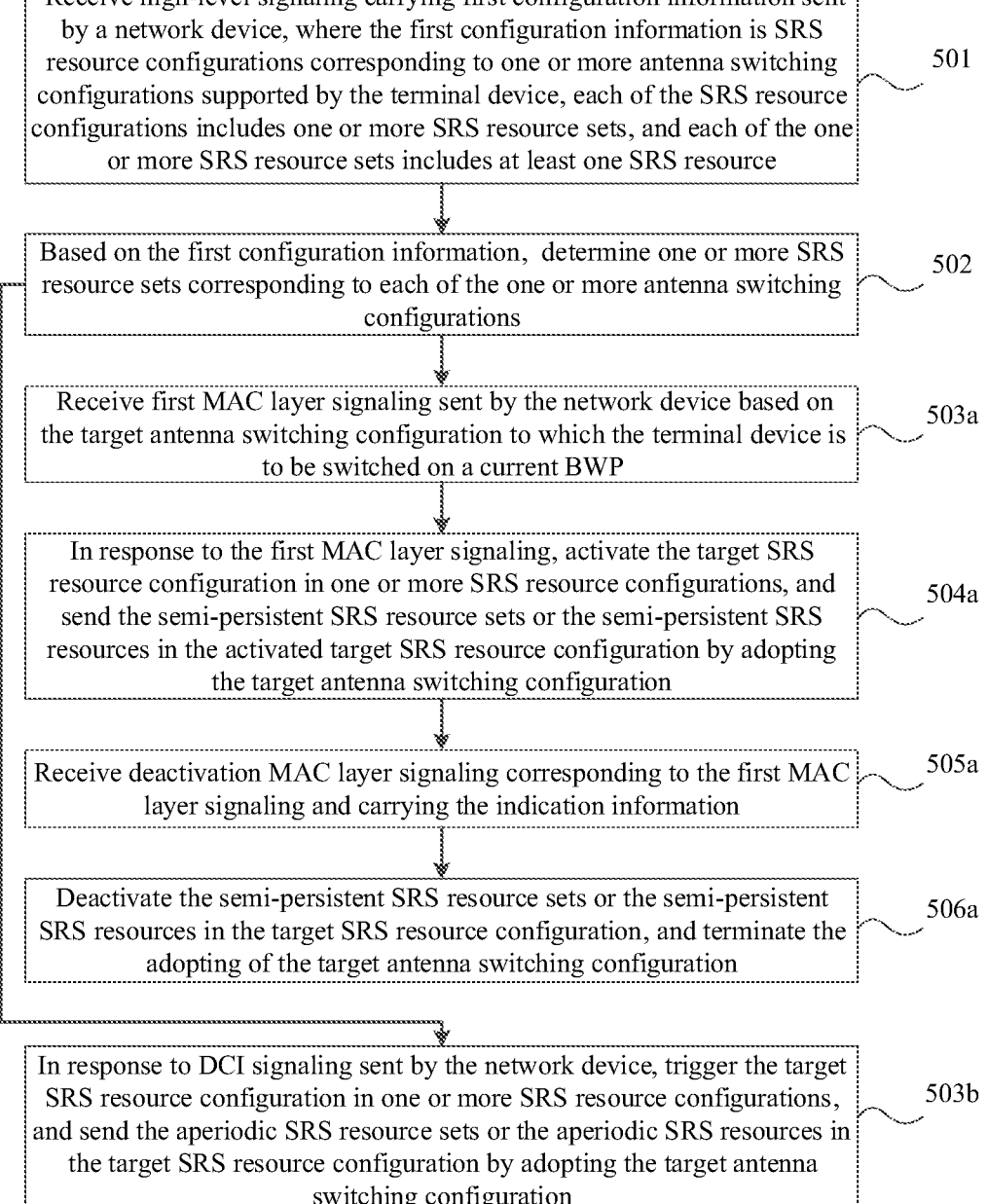

Receive high-level signaling carrying first configuration information sent by a network device, where the first configuration information is SRS resource configurations corresponding to one or more antenna switching configurations supported by the terminal device, each of the SRS resource configurations includes one or more SRS resource sets, and each of the one or more SRS resource sets includes at least one SRS resource — 501

Based on the first configuration information, determine one or more SRS resource sets corresponding to each of the one or more antenna switching configurations — 502

Receive first MAC layer signaling sent by the network device based on the target antenna switching configuration to which the terminal device is to be switched on a current BWP — 503a In response to the first MAC layer signaling, activate the target SRS resource configuration in one or more SRS resource configurations, and send the semi-persistent SRS resource sets or the semi-persistent SRS resources in the activated target SRS resource configuration by adopting the target antenna switching configuration — 504a Receive deactivation MAC layer signaling corresponding to the first MAC layer signaling and carrying the indication information — 505a Deactivate the semi-persistent SRS resource sets or the semi-persistent SRS resources in the target SRS resource configuration, and terminate the adopting of the target antenna switching configuration — 506a In response to DCI signaling sent by the network device, trigger the target SRS resource configuration in one or more SRS resource configurations, and send the aperiodic SRS resource sets or the aperiodic SRS resources in the target SRS resource configuration by adopting the target antenna switching configuration — 503b

FIG. 5

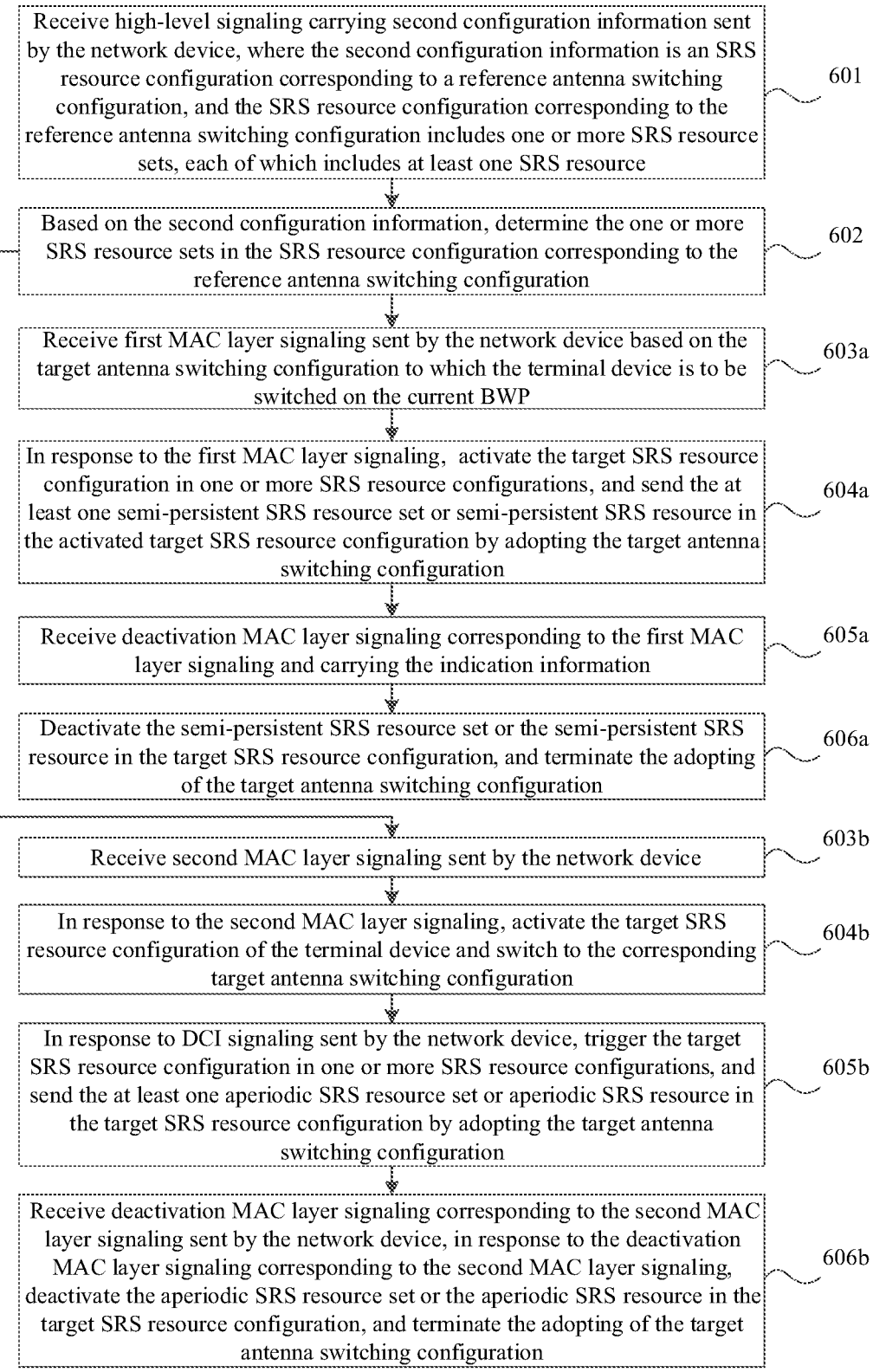

Receive high-level signaling carrying second configuration information sent by the network device, where the second configuration information is an SRS resource configuration corresponding to a reference antenna switching configuration, and the SRS resource configuration corresponding to the reference antenna switching configuration includes one or more SRS resource sets, each of which includes at least one SRS resource          601

Based on the second configuration information, determine the one or more SRS resource sets in the SRS resource configuration corresponding to the reference antenna switching configuration          602

Receive first MAC layer signaling sent by the network device based on the target antenna switching configuration to which the terminal device is to be switched on the current BWP          603a In response to the first MAC layer signaling, activate the target SRS resource configuration in one or more SRS resource configurations, and send the at least one semi-persistent SRS resource set or semi-persistent SRS resource in the activated target SRS resource configuration by adopting the target antenna switching configuration          604a Receive deactivation MAC layer signaling corresponding to the first MAC layer signaling and carrying the indication information          605a Deactivate the semi-persistent SRS resource set or the semi-persistent SRS resource in the target SRS resource configuration, and terminate the adopting of the target antenna switching configuration          606a Receive second MAC layer signaling sent by the network device          603b In response to the second MAC layer signaling, activate the target SRS resource configuration of the terminal device and switch to the corresponding target antenna switching configuration          604b In response to DCI signaling sent by the network device, trigger the target SRS resource configuration in one or more SRS resource configurations, and send the at least one aperiodic SRS resource set or aperiodic SRS resource in the target SRS resource configuration by adopting the target antenna switching configuration          605b Receive deactivation MAC layer signaling corresponding to the second MAC layer signaling sent by the network device, in response to the deactivation MAC layer signaling corresponding to the second MAC layer signaling, deactivate the aperiodic SRS resource set or the aperiodic SRS resource in the target SRS resource configuration, and terminate the adopting of the target antenna switching configuration          606b

Apparatus For Switching
Antenna Switching
Configuration
710

Sending
Module

800

Apparatus For Switching
Antenna Switching
Configuration

Receiving
Module
810

Switching
Module
820

METHODS FOR SWITCHING ANTENNA SWITCHING CONFIGURATION, AND COMMUNICATION DEVICE

CROSS REFERENCE TO RELATED APPLICATIONS

This application is the national phase of International Application No. PCT/CN2020/140738 filed on Dec. 29, 2020, the disclosure of which is hereby incorporated by reference in its entirety.

TECHNICAL FIELD

The present disclosure relates to the technical field of wireless communication, and in particular to methods for switching an antenna switching configuration and a communication device.

BACKGROUND

In a wireless communication system, a terminal device can support a plurality of transmission-reception capabilities; that is, there are a plurality of terminal antenna switching capabilities. At present, there are mainly one transmission and one reception (1T1R), two transmissions and two receptions (2T2R), four transmissions and four receptions (4T4R), as well as one transmission and two receptions (1T2R), one transmission and four receptions (1T4R), and two transmissions and four receptions (2T4R). At the same time, the terminal device may report supporting a plurality of antenna switching capabilities, such as 1T1R-1T2R, 1T1R-1T2R-1T4R, 1T1R-1T2R-2T2R-2T4R, and 1T1R-1T2R-2T2R-1T4R-2T4R. A network device can configure an antenna switching configuration corresponding to a terminal antenna switching capability on each bandwidth part (BWP). Considering that in order to adapt to the related business or scenario, the terminal device may need to change the antenna switching configuration, such as from 2T4R to 1T4R or 2T2R, or from 2T2R to 4T4R. In this case, different sounding reference signal (SRS) resource configurations with the function of "antenna switching" need to be used for obtaining downlink channel state information (CSI). For example, the same terminal device can reduce the antenna switching configuration from two transmissions and four receptions (2T4R) to one transmission and four receptions (1T4R), and can also improve the antenna switching configuration from one transmission and two receptions (1T2R) to one transmission and four receptions (1T4R). In other words, the terminal device can be scheduled by the network device to change or fallback the antenna switching configuration under its own supported transmission-reception capabilities, so as to adapt to business requirements.

SUMMARY

An aspect of the embodiments of the present disclosure proposes a method for switching an antenna switching configuration, which is applied to a network device. The method includes: according to a target antenna switching configuration to which a terminal device is to switch on a current bandwidth part (BWP), sending indication information for activating a corresponding target sounding reference signal (SRS) resource configuration to the terminal device.

A second aspect of the embodiments of the present disclosure proposes another method for switching an antenna switching configuration, which is applied to a terminal device. The method includes: receiving indication information of a target sounding reference signal (SRS) resource configuration sent by a network device; and according to the indication information of the target SRS resource configuration, switching to a corresponding target antenna switching configuration on a current bandwidth part (BWP).

A third aspect of the embodiments of the present disclosure proposes a communication device, including a transceiver, a memory, and a processor that is connected to the transceiver and the memory. The processor is configured to control wireless signal transmission and reception of the transceiver by executing computer executable instructions on the memory, and can achieve the method for switching an antenna switching configuration provided in the first aspect of the embodiments of the present disclosure, or the method for switching an antenna switching configuration provided in the second aspect of the embodiments of the present disclosure.

A fourth aspect of the embodiments of the present disclosure proposes a computer storage medium storing computer executable instructions; where after the computer executable instructions are executed by the processor, the method for switching an antenna switching configuration provided in the first aspect of the embodiments of the present disclosure can be implemented, or the method for switching an antenna switching configuration provided in the second aspect of the embodiments of the present disclosure can be implemented.

The additional aspects and advantages of the present disclosure will be partially provided in the following description, and some will become apparent from the following description or learned through the practice of the present disclosure.

BRIEF DESCRIPTION OF THE DRAWINGS

The above and/or additional aspects and advantages of the present disclosure will be apparent and easily understood from the following description of embodiments in conjunction with accompanying drawings.

FIG. 1 is a flowchart illustrating a method for switching an antenna switching configuration according to an embodiment of the present disclosure.

FIG. 2 is a flowchart illustrating another method for switching an antenna switching configuration according to an embodiment of the present disclosure.

FIG. 3 is a flowchart illustrating yet another method for switching an antenna switching configuration according to an embodiment of the present disclosure.

FIG. 5 is a flowchart illustrating yet another method for switching an antenna switching configuration according to an embodiment of the present disclosure.

FIG. 6 is a flowchart illustrating yet another method for switching an antenna switching configuration according to an embodiment of the present disclosure.

DETAILED DESCRIPTION OF THE EMBODIMENTS

Figure 4:
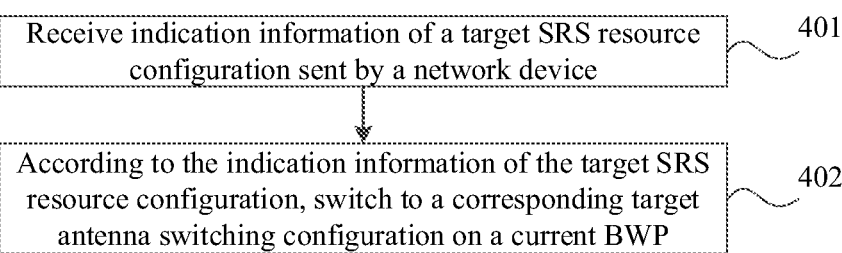
FIG. 4 is a flowchart illustrating yet another method for switching an antenna switching configuration according to an embodiment of the present disclosure.

Exemplary embodiments will be described in detail herein, examples of which are illustrated in the accompanying drawings. When the following descriptions involve the drawings, like numerals in different drawings refer to like or similar elements unless otherwise indicated. Implementations described in the following exemplary embodiments do not represent all implementations consistent with the present disclosure. Rather, they are merely examples of apparatuses and methods consistent with some aspects of the present disclosure as detailed in the appended claims.

Terms used in the embodiments of the present disclosure are for the purpose of describing specific embodiments only, and are not intended to limit the present disclosure. The singular forms "a", "an", and "this" used in the embodiments of the present disclosure and the appended claims are also intended to include plural forms, unless the context clearly indicates other meanings. It should also be understood that the term "and/or" as used herein refers to and includes any and all possible combinations of one or more of the associated listed items.

It should be understood that although terms first, second, third, etc. may be used in the embodiments of the present disclosure to describe various information, such information should not be limited to these terms. These terms are only used to distinguish the same type of information from each other. For example, first information may also be referred to as second information, and similarly, the second information may also be referred to as the first information without departing from the scope of the present disclosure. Depending on the context, the word "if" as used herein can be interpreted as "at the time of", "when", or "in response to determining".

The embodiments of the present disclosure will be described in detail below, and examples of the embodiments are illustrated in the accompanying drawings, where the same or similar reference numerals represent the same or similar elements throughout. The embodiments described below with reference to the accompanying drawings are exemplary and intended to explain the present disclosure, and should not be construed as a limitation on the present disclosure.

In the scenario where an antenna switching configuration of the terminal device needs to be switched, in the related art, switching of the antenna switching configuration of the terminal device can be achieved through radio resource control (RRC) reconfiguration or bandwidth part (BWP) switching. The related protocols can support that the antenna switching of a terminal device is configured according to BWP instead of the terminal device configuration. Therefore, switching of the antenna switching configuration can be achieved through RRC reconfiguration or BWP switching, and dynamic switching or fallback of the antenna switching configuration on the related working BWP cannot be achieved. Therefore, there are significant problems in flexibility and complexity, and changes in antenna switching configuration cannot be effectively supported. In the related research, considering that there are still requirements to further increase the number of antennas for a terminal device, the number of reception antennas is increased to support a maximum of 6 or 8 reception antennas in standardization. For a terminal device that supports up to 8 reception antennas, it can report various supported antenna switching configurations. The contradiction of the requirements of changing antenna switching configurations for such a terminal device will be even stronger.

In the related art, a bandwidth part (BWP) needs to be changed in antenna switching configuration switching based on the BWP; that is, the BWP needs to be changed with switching of the antenna switching configuration, which is not flexible. Switching of the antenna switching configuration of a terminal device through radio resource control (RRC) reconfiguration has a high complexity in implementation. In the research of R17, considering that physical channels of antennas of the terminal device need to be further increased, antenna switching configurations that can be adopted by the terminal device are accordingly increased under supported antenna transmission-reception capabilities, and a relatively simple and flexible switching manner of the antenna switching configuration is needed.

In the present disclosure, there is provided a manner in which a network device performs switching of an antenna switching configuration on a terminal device based on a sounding reference signal (SRS) resource configuration. Thus, the antenna switching configuration can be switched without RRC reconfiguration or BWP configuration change.

The methods and apparatuses for switching an antenna switching configuration, and a communication device provided in the present disclosure will be described in detail below with reference to the accompanying drawings.

FIG. 1 is a flowchart illustrating a method for switching an antenna switching configuration according to an embodiment of the present disclosure, which is applied to a network device.

The network device can be a base station, which can include a plurality of cells that provide services for terminal devices. According to different application scenarios, the base stations can also be referred to as an access point, or it can be a device in an access network that communicates with wireless terminal devices through one or more sectors on an air interface, or other names.

As shown in FIG. 1, the method includes the following step 101.

In step 101, according to a target antenna switching configuration to which a terminal device is to switch on a current BWP, indication information for activating a corresponding target SRS resource configuration is sent to the terminal device.

The target antenna switching configuration is an antenna switching configuration to be switched to among one or more antenna switching configurations supported by the terminal device. The target SRS resource configuration corresponds to one or more SRS resource sets, each of which includes at least one SRS resource. The SRS resource can be a semi-persistent SRS resource or an aperiodic SRS resource, and the type of the SRS resource in this embodiment is not limited.

The network device determines one or more antenna switching configurations of the terminal device based on the number of transmission-reception channels supported by the antenna transmission-reception capability of the terminal device. The antenna switching configurations that the terminal device may support are listed below, where T represents the number of transmission channels, and R represents the number of reception channels.

Based on physical channels of antennas, transmission-reception capabilities of a terminal defined by R15 and R16 can be divided into the same number of transmission antennas and reception antennas, and more reception antennas than transmission antennas. The number of transmission antennas and reception antennas is the same, that is, T=R, specifically including: one transmission and one reception (1T1R), two transmissions and two receptions (2T2R), and four transmissions and four receptions (4T4R). The transmitting-receiving capabilities of a terminal can also include more reception antennas than transmission antennas, that is, R>T, specifically including: one transmission and two receptions (1T2R), one transmission and four receptions (1T4R), and two transmissions and four receptions (2T4R).

A mapping relationship between the antenna switching configurations of the terminal device and the SRS resource configurations is configured by the network device.

In a possible implementation, the network device configures a corresponding SRS resource configuration for each of the antenna switching configurations of the terminal device.

In another possible implementation, the network device configures a corresponding SRS resource configuration for at least one antenna switching configuration of the terminal device. The SRS resource configuration includes one or more SRS resource sets, where each SRS resource set includes at least one SRS resource. The target SRS resource configuration is an SRS resource set corresponding to the at least one configured antenna switching configuration, or part of one or more SRS resource sets corresponding to the at least one configured antenna switching configuration, or at least part of SRS resources in one or more SRS resource sets corresponding to the at least one configured antenna switching configuration.

Since the network device has configured the mapping relationship between the antenna switching configurations of the terminal device and the SRS resource configurations, after determining the target antenna switching configuration to which the terminal device is to switch, based on the mapping relationship, the corresponding target SRS resource configuration can be indicated to the terminal device. That is, the indication information for activating the target SRS resource configuration is sent to the terminal device. Thus, after receiving the indication information, based on the known mapping relationship between the antenna switching configurations of the terminal device and the SRS resource configurations, the terminal device can determine the target antenna switching configuration to be switched to.

In some possible implementations, the indication information for activating the target SRS resource configuration can be carried in control signaling. The control signaling can include medium access control (MAC) layer signaling, such as MAC control element (MAC-CE) signaling. The control signaling can also be downlink control information (DCI) signaling. The specific form of the indication information is not limited to this embodiment.

There are at least the following possibilities for the specific implementation form of the indication information.

As a first possible implementation form, the indication information is a resource identifier (ID) of the target SRS resource configuration.

As a second possible implementation form, the indication information is a bitmap in which one or more bits corresponding to the target SRS resource configuration are enabled.

As a third possible implementation form, the indication information is one or more codepoints corresponding to one or more SRS resource sets or an SRS resource combination in the target SRS resource configuration. A corresponding relationship between the one or more SRS resource sets or the SRS resource combination and the codepoints is configured by the network device and notified to the terminal device.

In the method for switching an antenna switching configuration in the embodiment of the present disclosure, according to the target antenna switching configuration to which the terminal device is to switch on the current BWP, the network device sends the indication information for activating the corresponding target SRS resource configuration to the terminal device, so that after receiving the indication information of the target SRS resource configuration sent by the network device, based on the indication information of the target SRS resource configuration, the terminal device switches to the corresponding target antenna switching configuration on the current BWP. Therefore, switching the antenna switching configuration of the terminal device on the current BWP can be realized without BWP switching or RRC reconfiguration, improving the switching flexibility of the antenna switching configuration and reducing the switching complexity.

It can be understood by those skilled in the art that the technical solution of step 101 can be implemented separately or together with any other technical solution in the embodiment of the present disclosure, which is not limited to the embodiment of the present disclosure.

FIG. 2 is a flowchart illustrating another method for switching an antenna switching configuration according to an embodiment of the present disclosure, which is applied to a network device. As shown in FIG. 2, the method includes the following steps 201-204a.

First, in step 201, for one or more antenna switching configurations supported by a terminal device on a current BWP, one or more SRS resource sets corresponding to each of the one or more antenna switching configurations are determined.

The terminal device can support one or more antenna switching configurations, and the network device can configure one or more SRS resource sets corresponding to each antenna switching configuration as an SRS resource configuration corresponding to the antenna switching configuration.

Then, in step 202, high-level signaling carrying first configuration information is sent to the terminal device, where the first configuration information is SRS resource configurations corresponding to the one or more antenna switching configurations.

The first configuration information indicates the SRS resource configuration corresponding to each of the one or more antenna switching configurations supported by the terminal device. The first configuration information includes the SRS resource configurations corresponding to different antenna switching configurations. Each of the SRS resource configurations can include one or more SRS resource sets, and each of the one or more SRS resource sets can include at least one SRS resource.

The high-level signaling can be, for example, RRC signaling. The corresponding SRS resource configuration can be configured for each antenna switching configuration supported by the terminal device through the high-level signaling.

Therefore, when the terminal device needs to perform the switching of the antenna switching configuration, a target SRS resource configuration corresponding to a target antenna switching configuration to be switched to can be activated.

In some scenarios, one or more SRS resource sets included in the target SRS resource configuration to be activated are one or more semi-persistent SRS resource sets, or one or more SRS resources included in the target SRS resource configuration are one or more semi-persistent SRS resources, and steps 203*a* to 204*a* are performed.

Next in step 203*a*, based on the target antenna switching configuration to which the terminal device is to switch on the current BWP, first MAC layer signaling is sent to the terminal device to activate the target SRS resource configuration for sending the semi-persistent SRS resource sets or the semi-persistent SRS resources.

The first MAC layer signaling, which carries indication information of the target SRS resource configuration, is configured to activate the target SRS resource configuration in a plurality of configured SRS resource configurations, so that the terminal device can send the semi-persistent SRS resource sets or the semi-persistent SRS resources by adopting the activated target SRS resource configuration.

Further, after step 203*a*, if it is necessary to terminate adopting of the target antenna switching configuration by the terminal device and stop sending the semi-persistent SRS resource sets or the semi-persistent SRS resources by adopting the target antenna switching configuration, it is also necessary that the terminal device performs the deactivation of the corresponding target SRS resource configuration to stop the sending of the semi-persistent SRS resource sets or the semi-persistent SRS resources, as shown in step 204*a*.

In step 204*a*, in response to the termination of adopting the target antenna switching configuration by the terminal device, deactivation MAC layer signaling corresponding to the first MAC layer signaling and carrying the indication information is sent to the terminal device.

The indication information carried by the deactivation MAC layer signaling corresponding to the first MAC layer signaling is the indication information of the target SRS resource configuration mentioned above. For the specific form of the indication information, please refer to the description of the relevant parts in other embodiments, which will not be repeated in this embodiment.

In other scenarios, one or more SRS resource sets included in the target SRS resource configuration to be activated are one or more aperiodic SRS resource sets, or one or more SRS resources included in the target SRS resource configuration are one or more aperiodic SRS resources, and step 203*b* is performed after step 202.

In step 203*b*, DCI signaling is sent to the terminal device to trigger the target SRS resource configuration for sending the aperiodic SRS resource sets or the aperiodic SRS resources.

The DCI signaling is configured to trigger the target SRS resource configuration in a plurality of configured SRS resource configurations for the sending of the aperiodic SRS resource sets or the aperiodic SRS resources. In the DCI signaling, the indication information is in a target indication field.

As a possible implementation, the target indication field is an extension of a bitwidth of an SRS resource indication (SRI) field. Therefore, more possible SRS resource configurations can be indicated, for example, the bitwidth of the DCI bitfield can be extended to 3 bits to support the indication requirements of different SRS resource configurations. Different values in the SRI field can indicate different aperiodic SRS-Resource Triggers.

As another possible implementation, the target indication field is a redefined SRI field. That is, an SRI field which includes bits corresponding to SRS resource sets corresponding to respective antenna switching configurations. The target indication field determines whether to enable a corresponding SRS resource configuration through a bitmap, and takes the enabled SRS resource configuration as the target resource configuration. For example, the antenna switching configuration corresponding to each bit is respectively configured, so as to indirectly determine the SRS resource configuration corresponding to each bit based on the relationship between the antenna switching configurations and the SRS resource configurations. Or, for example, the correspondence between respective bits and identifiers (IDs) of resource sets of respective SRS resource configurations is configured. The target indication field can also determine whether to enable the corresponding SRS resource configuration through one or more codepoints, and takes the enabled SRS resource configuration as the target resource configuration.

In the method for switching an antenna switching configuration in the embodiment of the present disclosure, according to the target antenna switching configuration to which the terminal device is to switch on the current BWP, the indication information for activating the corresponding target SRS resource configuration is sent to the terminal device. So that after receiving the indication information of the target SRS resource configuration sent by the network device, based on the indication information of the target SRS resource configuration, the terminal device switches to the corresponding target antenna switching configuration on the current BWP. Therefore, switching of the antenna switching configuration of the terminal device on the current BWP can be realized without BWP switching or RRC reconfiguration, improving the switching flexibility of the antenna switching configuration and reducing the switching complexity.

FIG. 3 is a flowchart illustrating yet another method for switching an antenna switching configuration according to an embodiment of the present disclosure, which is applied to a network device. As shown in FIG. 3, the method includes the following steps 301-305*b*.

In step 301, a corresponding SRS resource configuration is determined for a reference antenna switching configuration of a terminal device on a current BWP, where the SRS resource configuration includes one or more SRS resource sets.

The reference antenna switching configuration includes an antenna switching configuration selected by the network device, or a highest antenna switching configuration corresponding to a highest capability supported by the terminal device. As a possible implementation, the antenna switching configuration selected by the network device can be an antenna switching configuration currently adopted by the terminal device. As another possible implementation, the antenna switching configuration selected by the network device can be an antenna switching configuration determined based on a setting rule from antenna switching configurations supported by the terminal device. For example, in some scenarios, the network device can select the highest antenna switching configuration corresponding to the highest capability supported by the terminal device.

Based on the transmission-reception capabilities of the terminal device, the highest antenna switching configuration corresponding to the highest capability supported by the terminal device can be determined according to the number of reception antennas and transmission antennas. In some implementations, the highest antenna switching configuration can be an antenna switching configuration with the largest number of reception antennas, or an antenna switching configuration with the largest number of transmission antennas, or an antenna switching configuration with both the largest number of reception antennas and the largest number of transmission antennas.

For the reference antenna switching configuration, one or more corresponding SRS resource sets are configured on the current BWP as the SRS resource configuration corresponding to the reference antenna switching configuration.

Next, in step 302, high-level signaling carrying second configuration information is sent to the terminal device.

The second configuration information is the SRS resource configuration corresponding to the reference antenna switching configuration. The SRS resource configuration corresponding to the reference antenna switching configuration includes one or more SRS resource sets, and each SRS resource set includes at least one SRS resource.

The high-level signaling can be, for example, RRC signaling. The high-level signaling can pre-configure the SRS resource configuration corresponding to the reference antenna switching configuration. As the configured SRS resource configuration includes the one or more SRS resource sets, and each SRS resource set includes at least one SRS resource, a part of the SRS resource sets or SRS resources can be dynamically selected from the SRS resource configuration as the target SRS resource configuration. Thereby, achieving dynamic switching of the antenna switching configuration of the terminal device. In other words, the target SRS resource configuration corresponding to the target antenna switching configuration to be switched to is at least part of the SRS resources in the one or more SRS resource sets corresponding to the reference antenna switching configuration of the terminal device.

In some scenarios, at least one SRS resource set included in the target SRS resource configuration to be activated is at least one semi-persistent SRS resource set, or at least one SRS resource included in the target SRS resource configuration is at least one semi-persistent SRS resource, and steps 303a to 304a are performed.

In step 303a, based on the target antenna switching configuration to which the terminal device is to switch on the current BWP, first MAC layer signaling is sent to the terminal device to activate and send the at least one semi-persistent SRS resource set or semi-persistent SRS resource belonging to the target SRS resource configuration in the configured SRS resource configuration.

In step 303a, the first MAC layer signaling, which carries indication information of the target SRS resource configuration, is configured to activate the target SRS resource configuration in the configured SRS resource configuration, so that the terminal device can send the semi-persistent SRS resource set or the semi-persistent SRS resource by adopting the activated target SRS resource configuration.

Further, after step 303a, if it is necessary to terminate adopting of the target antenna switching configuration by the terminal device and stop sending the semi-persistent SRS resource set or the semi-persistent SRS resource by adopting the target antenna switching configuration, it is also necessary to indicate the terminal device to deactivate the corresponding target SRS resource configuration to stop the sending of the semi-persistent SRS resource set or the semi-persistent SRS resource, as shown in step 304a.

In step 304a, in response to the termination of adopting of the target antenna switching configuration by the terminal device, deactivation MAC layer signaling corresponding to the first MAC layer signaling and carrying the indication information is sent to the terminal device.

The indication information carried by the deactivation MAC layer signaling corresponding to the first MAC layer signaling is the indication information of the target SRS resource configuration mentioned above. For the specific form of the indication information, please refer to the description of the relevant parts in other embodiments, which will not be repeated in this embodiment.

In other scenarios, at least one SRS resource set included in the target SRS resource configuration to be activated is at least one aperiodic SRS resource set, or at least one SRS resource included in the target SRS resource configuration is at least one aperiodic SRS resource, and steps 303b to 305b are performed after step 302.

In step 303b, second MAC layer signaling is sent to the terminal device to activate at least one aperiodic SRS resource set or aperiodic SRS resource in the target SRS resource configuration of the terminal device. The second MAC layer signaling, which carries the indication information of the target SRS resource configuration, is configured to activate an SRS resource configuration of the terminal device. The activated SRS resource configuration is the target SRS resource configuration.

Then in step 304b, DCI signaling is sent to the terminal device to trigger the target SRS resource configuration for sending of the aperiodic SRS resource set or the aperiodic SRS resource. The DCI signaling, which carries the indication information of the target SRS resource configuration, is configured to trigger the sending of the aperiodic SRS resource set or the aperiodic SRS resource belonging to the target SRS resource configuration in the configured SRS resource configuration. In DCI signaling, the indication information is in a target indication field.

As a possible implementation, the target indication field is an extension of a bitwidth of an SRS resource indication (SRI) field. Therefore, more possible SRS resource configurations can be indicated, for example, the bitwidth of the DCI bitfield can be extended to 3 bits to support the indication requirements of different SRS resource configurations. Different values in the SRI field can indicate different aperiodic SRS-Resource Triggers.

As another possible implementation, the target indication field is a redefined SRI field. That is, an SRI field includes bits corresponding to SRS resource sets corresponding to respective antenna switching configurations. The target indication field determines whether to enable a corresponding SRS resource configuration through a bitmap, and takes the enabled SRS resource configuration as the target resource configuration. For example, the antenna switching configuration corresponding to each bit is respectively configured, so as to indirectly determine the SRS resource configuration corresponding to each bit based on the relationship between the antenna switching configurations and the SRS resource configurations. Or, for example, the correspondence between respective bits and identifiers (IDs) of resource sets of respective SRS resource configurations is configured. The target indication field can also determine whether to enable the corresponding SRS resource configuration through one or more codepoints, and takes the enabled SRS resource configuration as the target resource configuration.

Further, after step 304b, if it is necessary to terminate the adoption of the target antenna switching configuration by the terminal device, it is also necessary to indicate to the terminal device to deactivate the corresponding target SRS resource configuration, as shown in step 305b.

Then, in step 305b, in response to the termination of adopting of the target antenna switching configuration by the terminal device, deactivation MAC layer signaling corresponding to the first MAC layer signaling and carrying the indication information is sent to the terminal device.

In the method for switching an antenna switching configuration in the embodiment of the present disclosure, according to the target antenna switching configuration to which the terminal device is to switch on the current BWP, the indication information for activating the corresponding target SRS resource configuration is sent to the terminal device. So that after receiving the indication information of the target SRS resource configuration sent by the network device, based on the indication information of the target SRS resource configuration, the terminal device switches to the corresponding target antenna switching configuration on the current BWP. Therefore, switching of the antenna switching configuration of the terminal device on the current BWP can be realized without BWP switching or RRC reconfiguration, improving the switching flexibility of the antenna switching configuration and reducing the switching complexity.

FIG. 4 is a flowchart illustrating yet another method for switching an antenna switching configuration according to an embodiment of the present disclosure, which is applied to a terminal device. As shown in FIG. 4, the method includes the following steps 401 and 402.

In step 401, the indication information of a target SRS resource configuration sent by a network device is received.

In some possible implementations, the indication information for activating the target SRS resource configuration can be carried in control signaling. The control signaling can include MAC layer signaling, such as MAC-CE signaling. The control signaling can also be DCI signaling. The specific form of the indication information is not limited to this embodiment.

There are at least the following possibilities for the specific implementation form of the indication information.

As a first possible implementation form, the indication information is a resource identifier (ID) of the target SRS resource configuration.

As a second possible implementation form, the indication information is a bitmap in which one or more bits corresponding to the target SRS resource configuration are enabled.

As a third possible implementation form, the indication information is one or more codepoints corresponding to one or more SRS resource sets or an SRS resource combination in the target SRS resource configuration. A corresponding relationship between the one or more SRS resource sets or the SRS resource combination and the codepoints is configured by the network device and notified to the terminal device.

Then, in step 402, according to the indication information of the target SRS resource configuration, it is switched to a corresponding target antenna switching configuration on a current BWP.

The target antenna switching configuration is an antenna switching configuration to be switched to among one or more antenna switching configurations supported by the terminal device. The target SRS resource configuration corresponds to one or more SRS resource sets, each of which includes at least one SRS resource. The SRS resource can be a semi-persistent SRS resource or an aperiodic SRS resource, and the type of the SRS resource in this embodiment is not limited.

The network device determines one or more antenna switching configurations of the terminal device based on the number of transmission-reception channels supported by the antenna transmission-reception capability of the terminal device. The antenna switching configurations that the terminal device may support are listed below, where T represents the number of transmission channels, and R represents the number of reception channels.

Transmission-reception capabilities of a terminal defined by R15 and R16 can be divided into the same number of transmission antennas and reception antennas, and more reception antennas than transmission antennas. The number of transmission antennas and reception antennas is the same, that is, T=R, specifically including: one transmission and one reception (1T1R), two transmissions and two receptions (2T2R), and four transmissions and four receptions (4T4R). Reception antennas are more than transmission antennas, that is, R>T, specifically including: one transmission and two receptions (1T2R), one transmission and four receptions (1T4R), and two transmissions and four receptions (2T4R).

A mapping relationship between the antenna switching configurations of the terminal device and the SRS resource configurations is configured by the network device.

In a possible implementation, the network device configures a corresponding SRS resource configuration for each of the antenna switching configurations of the terminal device.

In another possible implementation, the network device configures a corresponding SRS resource configuration for at least one antenna switching configuration of the terminal device. The SRS resource configuration includes one or more SRS resource sets, where each SRS resource set includes at least one SRS resource. The target SRS resource configuration is an SRS resource set corresponding to the at least one configured antenna switching configuration, or part of one or more SRS resource sets corresponding to the at least one configured antenna switching configuration, or at least part of SRS resources in one or more SRS resource sets corresponding to the at least one configured antenna switching configuration.

Since the network device has configured the mapping relationship between the antenna switching configurations of the terminal device and the SRS resource configurations, after determining the target antenna switching configuration to which the terminal device is to switch, based on the mapping relationship, the corresponding target SRS resource configuration can be indicated to the terminal device. That is, the indication information for activating the target SRS resource configuration is sent to the terminal device. Thus, after receiving the indication information, based on the known mapping relationship between the antenna switching configurations of the terminal device and the SRS resource configurations, the terminal device can determine the target antenna switching configuration to be switched to.

In the method for switching an antenna switching configuration in the embodiment of the present disclosure, according to the target antenna switching configuration to which the terminal device is to switch on the current BWP, the network device sends the indication information for activating the corresponding target SRS resource configuration to the terminal device, so that after receiving the indication information of the target SRS resource configuration sent by the network device, based on the indication information of the target SRS resource configuration, the terminal device switches to the corresponding target antenna switching configuration on the current BWP. Therefore, switching of the antenna switching configuration of the terminal device on the current BWP can be realized without BWP switching or RRC reconfiguration, improving the switching flexibility of the antenna switching configuration and reducing the switching complexity.

It can be understood by those skilled in the art that the technical solution of step 401 or 501, explained later, can be implemented separately or together with any other technical solution in the embodiment of the present disclosure, which is not limited to the embodiment of the present disclosure.

FIG. 5 is a flowchart illustrating yet another method for switching an antenna switching configuration according to an embodiment of the present disclosure, which is applied to a terminal device. As shown in FIG. 5, the method includes the following steps 501-506a.

In step 501, high-level signaling carrying first configuration information sent by a network device is received, where the first configuration information is SRS resource configurations corresponding to one or more antenna switching configurations supported by the terminal device, each of the SRS resource configurations includes one or more SRS resource sets, and each of the one or more SRS resource sets includes at least one SRS resource.

The high-level signaling can be, for example, RRC signaling. The corresponding SRS resource configuration can be configured for each antenna switching configuration supported by the terminal device through the high-level signaling.

Next, in step 502, based on the first configuration information, one or more SRS resource sets corresponding to each of the one or more antenna switching configurations are determined.

The terminal device can support one or more antenna switching configurations, and the network device determines one or more corresponding SRS resource sets for each antenna switching configuration as the SRS resource configuration corresponding to the antenna switching configuration. Thus, when the terminal device needs to switch an antenna switching configuration, a target SRS resource configuration corresponding to a target antenna switching configuration to be switched to can be activated.

In some scenarios, one or more SRS resource sets included in the target SRS resource configuration to be activated are one or more semi-persistent SRS resource sets, or one or more SRS resources included in the target SRS resource configuration are one or more semi-persistent SRS resources, and steps 503a to 506a are performed after step 502.

In step 503a, first MAC layer signaling sent by the network device based on the target antenna switching configuration to which the terminal device is to switch on a current BWP is received.

The first MAC layer signaling, which carries indication information of the target SRS resource configuration, is configured to activate the target SRS resource configuration in a plurality of configured SRS resource configurations, so that the terminal device can send the semi-persistent SRS resource sets or the semi-persistent SRS resources by adopting the activated target SRS resource configuration.

Next in step 504a, in response to the first MAC layer signaling, the target SRS resource configuration in one or more SRS resource configurations is activated, and the semi-persistent SRS resource sets or the semi-persistent SRS resources in the activated target SRS resource configuration are sent by adopting the target antenna switching configuration.

Further, after step 504a, if it is necessary to terminate adopting of the target antenna switching configuration by the terminal device and stop sending the semi-persistent SRS resource sets or the semi-persistent SRS resources by adopting the target antenna switching configuration, it is also necessary for the network device to indicate the terminal device to deactivate the corresponding target SRS resource configuration to stop the sending of the semi-persistent SRS resource sets or the semi-persistent SRS resources, as shown in steps 505a and 506a.

In step 505a, deactivation MAC layer signaling corresponding to the first MAC layer signaling and carrying the indication information is received.

The indication information carried by the deactivation MAC layer signaling corresponding to the first MAC layer signaling is the indication information of the target SRS resource configuration mentioned above. For the specific form of the indication information, please refer to the description of the relevant parts in other embodiments, which will not be repeated in this embodiment.

Then in step 506a, the semi-persistent SRS resource sets or the semi-persistent SRS resources in the target SRS resource configuration are deactivated, and the adoption of the target antenna switching configuration is terminated.

In other scenarios, one or more SRS resource sets included in the target SRS resource configuration to be activated are one or more aperiodic SRS resource sets, or one or more SRS resources included in the target SRS resource configuration are one or more aperiodic SRS resources, and step 503b is performed after step 502.

In step 503b, in response to DCI signaling sent by the network device, the target SRS resource configuration in one or more SRS resource configurations is triggered, and the aperiodic SRS resource sets or the aperiodic SRS resources in the target SRS resource configuration are sent by adopting the target antenna switching configuration.

The DCI signaling, which carries the indication information of the target SRS resource configuration, is configured to trigger the target SRS resource configuration in a plurality of configured SRS resource configurations for the sending of the aperiodic SRS resource sets or the aperiodic SRS resources. In DCI signaling, the indication information is in a target indication field.

As a possible implementation, the target indication field is an extension of a bitwidth of an SRS resource indication (SRI) field. Therefore, more possible SRS resource configurations can be indicated, for example, the bitwidth of the DCI bitfield can be extended to 3 bits to support the indication requirements of different SRS resource configurations. Different values in the SRI field can indicate different aperiodic SRS-Resource Triggers.

As another possible implementation, the target indication field is a redefined SRI field, that is, an SRI field which includes bits corresponding to SRS resource sets corresponding to respective antenna switching configurations. The target indication field determines whether to enable a corresponding SRS resource configuration through a bitmap, and takes the enabled SRS resource configuration as the target resource configuration. For example, the antenna switching configuration corresponding to each bit is respectively configured, so as to indirectly determine the SRS resource configuration corresponding to each bit based on the relationship between the antenna switching configurations and the SRS resource configurations. Or, for example, the correspondence between respective bits and identifiers (IDs) of resources sets of respective SRS resource configurations is configured. The target indication field can also determine whether to enable the corresponding SRS resource configuration through one or more codepoints, and takes the enabled SRS resource configuration as the target resource configuration.

In the method for switching an antenna switching configuration in the embodiment of the present disclosure, according to the target antenna switching configuration to which the terminal device is to switch on the current BWP, the indication information for activating the corresponding target SRS resource configuration is sent to the terminal device, so that after receiving the indication information of the target SRS resource configuration sent by the network device, based on the indication information of the target SRS resource configuration, the terminal device switches to the corresponding target antenna switching configuration on the current BWP. Therefore, switching of the antenna switching configuration of the terminal device on the current BWP can be realized without BWP switching or RRC reconfiguration, improving the switching flexibility of the antenna switching configuration and reducing the switching complexity.

FIG. 6 is a flowchart illustrating yet another method for switching an antenna switching configuration according to an embodiment of the present disclosure, which is applied to a terminal device. As shown in FIG. 6, the method includes the following steps 601-606b.

In step 601, high-level signaling carrying second configuration information sent by the network device is received, where the second configuration information is an SRS resource configuration corresponding to a reference antenna switching configuration, and the SRS resource configuration corresponding to the reference antenna switching configuration includes one or more SRS resource sets, each of which includes at least one SRS resource.

The high-level signaling can be, for example, RRC signaling. The high-level signaling can pre-configure the SRS resource configuration corresponding to the reference antenna switching configuration. As the configured SRS resource configuration includes the one or more SRS resource sets, and each SRS resource set includes at least one SRS resource, a part of the SRS resource sets or SRS resources can be dynamically selected from the SRS resource configuration as the target SRS resource configuration. Thereby, achieving dynamic switching of the antenna switching configuration of the terminal device. In other words, the target SRS resource configuration corresponding to the target antenna switching configuration to be switched to is at least part of the SRS resources in the one or more SRS resource sets corresponding to the reference antenna switching configuration of the terminal device.

The reference antenna switching configuration includes an antenna switching configuration selected by the network device, or a highest antenna switching configuration corresponding to a highest capability supported by the terminal device.

As a possible implementation, the antenna switching configuration selected by the network device can be an antenna switching configuration currently adopted by the terminal device. As another possible implementation, the antenna switching configuration selected by the network device can be an antenna switching configuration determined based on a setting rule from antenna switching configurations supported by the terminal device. For example, in some scenarios, the network device can select the highest antenna switching configuration corresponding to the highest capability supported by the terminal device.

Based on the transmission-reception capabilities of the terminal device, the highest antenna switching configuration corresponding to the highest capability supported by the terminal device can be determined according to the number of reception antennas and transmission antennas. In some implementations, the highest antenna switching configuration can be an antenna switching configuration with the largest number of reception antennas, or an antenna switching configuration with the largest number of transmission antennas, or an antenna switching configuration with both the largest number of reception antennas and the largest number of transmission antennas.

Next in step 602, based on the second configuration information, the one or more SRS resource sets in the SRS resource configuration corresponding to the reference antenna switching configuration are determined.

For the reference antenna switching configuration, the network device configures one or more corresponding SRS resource sets on the current BWP as the SRS resource configuration corresponding to the reference antenna switching configuration, so as to dynamically indicate at least one SRS resource set or SRS resource to be activated within the range of the one or more SRS resource sets in the SRS resource configuration corresponding to the reference antenna switching configuration when subsequently indicating the terminal device to switch the antenna switching configuration. Thus, according to one or more antenna ports to which the SRS resource set or SRS resource in the dynamically indicated target SRS resource configuration belongs, and the known mapping relationship between the antenna ports and the physical channels of antennas, the terminal device can determine the target antenna switching configuration to be switched to.

In some scenarios, the at least one SRS resource set included in the target SRS resource configuration to be activated is at least one semi-persistent SRS resource set, or the at least one SRS resource included in the target SRS resource configuration is at least one semi-persistent SRS resource, and steps 603a to 606a are performed after step 602.

In step 603a, first MAC layer signaling sent by the network device based on the target antenna switching configuration to which the terminal device is to switch on the current BWP is received.

In step 603a, the first MAC layer signaling, which carries indication information of the target SRS resource configuration, is configured to activate the target SRS resource configuration in the configured SRS resource configuration, so that the terminal device can send the semi-persistent SRS resource set or the semi-persistent SRS resource by adopting the activated target SRS resource configuration.

Next in step 604a, in response to the first MAC layer signaling, the target SRS resource configuration in one or more SRS resource configurations is activated, and the at least one semi-persistent SRS resource set or semi-persistent SRS resource in the activated target SRS resource configuration is sent by adopting the target antenna switching configuration.

Further, after step 604a, if it is necessary to terminate adopting of the target antenna switching configuration by the terminal device and stop sending the semi-persistent SRS resource set or the semi-persistent SRS resource by adopting the target antenna switching configuration, it is also necessary to indicate the terminal device to deactivate the corresponding target SRS resource configuration to stop the sending of the semi-persistent SRS resource set or the semi-persistent SRS resource, as shown in steps 605a and 606a.

In step 605a, deactivation MAC layer signaling corresponding to the first MAC layer signaling and carrying the indication information is received.

The indication information carried by the deactivation MAC layer signaling corresponding to the first MAC layer signaling is the indication information of the target SRS resource configuration mentioned above. For the specific form of the indication information, please refer to the description of the relevant parts in other embodiments, which will not be repeated in this embodiment.

Then in step 606*a*, the semi-persistent SRS resource set or the semi-persistent SRS resource in the target SRS resource configuration is deactivated, and the adoption of the target antenna switching configuration is terminated.

In other scenarios, at least one SRS resource set included in the target SRS resource configuration to be activated is at least one aperiodic SRS resource set, or at least one SRS resource included in the target SRS resource configuration is at least one aperiodic SRS resource, and steps 603*b* to 606*b* are performed after step 602.

In step 603*b*, the second MAC layer signaling sent by the network device is received.

The second MAC layer signaling, which carries the indication information of the target SRS resource configuration, is configured to activate an SRS resource configuration of the terminal device. The activated SRS resource configuration is the target SRS resource configuration.

Then, in step 604*b*, in response to the second MAC layer signaling, the target SRS resource configuration of the terminal device is activated, and it is switched to the corresponding target antenna switching configuration.

Since the network device has pre-configured the SRS resource configuration corresponding to the reference antenna switching configuration supported by the terminal device, based on the target SRS resource configuration indicated in the second MAC layer signaling, at least part of the SRS resource sets or SRS resources can be determined from the SRS resource configuration corresponding to the reference antenna switching configuration. Based on physical channels of antennas corresponding to the at least part of the SRS resource sets or SRS resources, the corresponding target antenna switching configuration is determined and it is switched to the corresponding target antenna switching configuration.

Next in step 605*b*, in response to DCI signaling sent by the network device, the target SRS resource configuration in one or more SRS resource configurations is triggered, and the at least one aperiodic SRS resource set or aperiodic SRS resource in the target SRS resource configuration is sent by adopting the target antenna switching configuration.

The DCI signaling, which carries the indication information of the target SRS resource configuration, is configured to trigger the sending of the aperiodic SRS resource set or the aperiodic SRS resource belonging to the target SRS resource configuration in the configured SRS resource configuration. In DCI signaling, the indication information is in a target indication field.

As a possible implementation, the target indication field is an extension of a bitwidth of an SRS resource indication (SRI) field. Therefore, more possible SRS resource configurations can be indicated, for example, the bitwidth of the DCI bitfield can be extended to 3 bits to support the indication requirements of different SRS resource configurations. Different values in the SRI field can indicate different aperiodic SRS-Resource Triggers.

As another possible implementation, the target indication field is a redefined SRI field, that is, an SRI field which includes bits corresponding to SRS resource sets corresponding to respective antenna switching configurations. The target indication field determines whether to enable a corresponding SRS resource configuration through a bitmap, and takes the enabled SRS resource configuration as the target resource configuration. For example, the antenna switching configuration corresponding to each bit is respectively configured, so as to indirectly determine the SRS resource configuration corresponding to each bit based on the relationship between the antenna switching configurations and the SRS resource configurations. Or, for example, the correspondence between respective bits and identifiers (IDs) of resources sets of respective SRS resource configurations is configured. The target indication field can also determine whether to enable the corresponding SRS resource configuration through one or more codepoints, and takes the enabled SRS resource configuration as the target resource configuration.

Further, after step 605*b*, if it is necessary to terminate the adoption of the target antenna switching configuration by the terminal device, it is also necessary to indicate to the terminal device to deactivate the corresponding target SRS resource configuration, as shown in step 606*b*.

In step 606*b*, deactivation MAC layer signaling corresponding to the second MAC layer signaling sent by the network device is received, in response to the deactivation MAC layer signaling corresponding to the second MAC layer signaling, the aperiodic SRS resource set or the aperiodic SRS resource in the target SRS resource configuration is deactivated, and the adopting of the target antenna switching configuration is terminated.

In the method for switching an antenna switching configuration in the embodiment of the present disclosure, according to the target antenna switching configuration to which the terminal device is to switch on the current BWP, the indication information for activating the corresponding target SRS resource configuration is sent to the terminal device, so that after receiving the indication information of the target SRS resource configuration sent by the network device, based on the indication information of the target SRS resource configuration, the terminal device switches to the corresponding target antenna switching configuration on the current BWP. Therefore, switching of the antenna switching configuration of the terminal device on the current BWP can be realized without BWP switching or RRC reconfiguration, improving the switching flexibility of the antenna switching configuration and reducing the switching complexity.

Corresponding to the methods for switching an antenna switching configuration provided in the embodiments as shown in FIGS. 1 to 3 above, the present disclosure also provides apparatuses for switching an antenna switching configuration. Since the apparatuses for switching an antenna switching configuration provided in the embodiments of the present disclosure correspond to the methods for switching an antenna switching configuration provided in the embodiments as shown in FIGS. 1 to 3 above, the implementation of the methods for switching an antenna switching configuration is also applicable to the apparatuses for switching an antenna switching configuration provided in the embodiments of the present disclosure, and will not be described in detail in the embodiments of the present disclosure.

Figure 7:
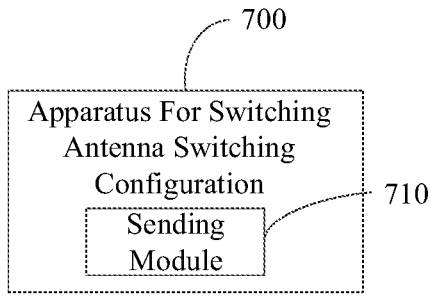
FIG. 7 is a schematic structural diagram illustrating an apparatus for switching an antenna switching configuration according to an embodiment of the present disclosure.

FIG. 7 is a schematic structural diagram illustrating an apparatus for switching an antenna switching configuration 700 according to an embodiment of the present disclosure, which is applied to a network device.

As shown in FIG. 7, the apparatus for switching an antenna switching configuration 700 can include a sending module 710.

The sending module 710 is configured to send, according to a target antenna switching configuration to which a terminal device is to switch on a current bandwidth part (BWP), indication information for activating a corresponding target sounding reference signal (SRS) resource configuration to the terminal device.

Optionally, the target SRS resource configuration is one or more SRS resource sets corresponding to the target antenna switching configuration to which the terminal device is to switch.

Optionally, the antenna switching configuration 700 can further include: a first determining module, configured to, for one or more antenna switching configurations supported by the terminal device, determine one or more SRS resource sets corresponding to each of the one or more antenna switching configurations.

The sending module 710 is further configured to send high-level signaling carrying first configuration information to the terminal device. Where the first configuration information is SRS resource configurations corresponding to the one or more antenna switching configurations, each of the SRS resource configurations includes the one or more SRS resource sets, respectively, and each of the one or more SRS resource sets includes at least one SRS resource.

Optionally, the target SRS resource configuration is at least part of the SRS resources in one or more SRS resource sets corresponding to a reference antenna switching configuration of the terminal device, where the reference antenna switching configuration includes an antenna switching configuration selected by the network device, or a highest antenna switching configuration corresponding to a highest capability supported by the terminal device.

Optionally, the antenna switching configuration 700 can further include: a second determining module configured to determine the one or more SRS resource sets in an SRS resource configuration corresponding to the reference antenna switching configuration of the terminal device.

The sending module 710 is further configured to send high-level signaling carrying second configuration information to the terminal device. Where the second configuration information is the SRS resource configuration corresponding to the reference antenna switching configuration, and the SRS resource configuration corresponding to the reference antenna switching configuration includes the one or more SRS resource sets, each of which includes at least one SRS resource.

Optionally, the indication information is carried in the first medium access control (MAC) layer signaling, where the first MAC layer signaling is configured to activate the target SRS resource configuration in one or more SRS resource configurations, so that the terminal device sends one or more semi-persistent SRS resource sets or one or more semi-persistent SRS resources by adopting the target SRS resource configuration.

Optionally, the sending module 710 is further configured to, in response to termination of the adoption of the target antenna switching configuration by the terminal device, send deactivation MAC layer signaling corresponding to the first MAC layer signaling and carrying the indication information to the terminal device.

Optionally, the indication information is carried in downlink control information (DCI) signaling, where the DCI signaling is configured to trigger the target SRS resource configuration in one or more SRS resource configurations for sending of one or more aperiodic SRS resource sets or one or more aperiodic SRS resources.

Optionally, in the DCI signaling, the indication information is in a target indication field, where the target indication field is an extension of a bitwidth of an SRS resource indication (SRI) field, or an SRI field including bits that correspond to SRS resource sets.

Optionally, the sending module 710 is further configured to send second medium access control (MAC) layer signaling to the terminal device. Where the second MAC layer signaling is configured to activate an SRS resource configuration of the terminal device, which is the target SRS resource configuration.

Optionally, the sending module 710 is further configured to, in response to termination of the adoption of the SRS resource configuration by the terminal device, send deactivation MAC layer signaling corresponding to the second MAC layer signaling to the terminal device.

Optionally, the indication information is a resource identifier (ID) of the target SRS resource configuration; or, the indication information is a bitmap in which one or more bits corresponding to the target SRS resource configuration are enabled; or, the indication information is one or more codepoints corresponding to one or more SRS resource sets or an SRS resource combination in the target SRS resource configuration; where a corresponding relationship between the one or more SRS resource sets or the SRS resource combination and the one or more codepoints is configured by the network device and notified to the terminal device.

In the apparatus for switching an antenna switching configuration provided in the embodiments of the present disclosure, according to the target antenna switching configuration to which the terminal device is to switch on the current BWP, the network device sends the indication information for activating the corresponding target SRS resource configuration to the terminal device. So that after receiving the indication information of the target SRS resource configuration sent by the network device, based on the indication information of the target SRS resource configuration, the terminal device switches to the corresponding target antenna switching configuration on the current BWP. Therefore, switching of the antenna switching configuration of the terminal device on the current BWP can be realized without BWP switching or RRC reconfiguration, improving the switching flexibility of the antenna switching configuration and reducing the switching complexity.

Correspondingly to the switching method of the antenna switching configuration provided in the embodiments of FIGS. 4 to 6 above, the present disclosure also provides an apparatus for switching an antenna switching configuration. Since the apparatuses for switching an antenna switching configuration provided in the embodiments of the present disclosure corresponds to the methods for switching an antenna switching configuration provided in the embodiments as shown in FIGS. 4 to 6 above, the implementation of the methods for switching an antenna switching configuration is also applicable to the apparatuses for switching an antenna switching configuration provided in the embodiments of the present disclosure, and will not be described in detail in the embodiments of the present disclosure.

Figure 8:
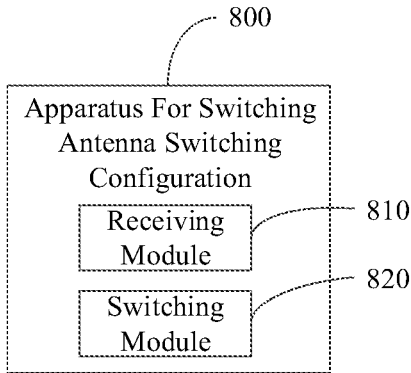
FIG. 8 is a schematic structural diagram illustrating another apparatus for switching an antenna switching configuration according to an embodiment of the present disclosure.

FIG. 8 is a schematic structural diagram illustrating another apparatus for switching an antenna switching configuration 800 according to an embodiment of the present disclosure, which is applied to a terminal device.

As shown in FIG. 8, an apparatus for switching an antenna switching configuration 800 can include a receiving module 810 and a switching module 820.

The receiving module 810 is configured to receive indication information of a target sounding reference signal (SRS) resource configuration sent by a network device.

The switching module 820 is configured to, according to the indication information of the target SRS resource configuration, switch to a corresponding target antenna switching configuration on a current bandwidth part (BWP).

Optionally, the target SRS resource configuration is one or more SRS resource sets corresponding to the target antenna switching configuration to which the terminal device is to switch.

Optionally, the receiving module 810 is further configured to receive high-level signaling carrying first configuration information sent by the network device. Where the first configuration information is SRS resource configurations corresponding to one or more antenna switching configurations supported by the terminal device, each of the SRS resource configurations includes one or more SRS resource sets, and each of the one or more SRS resource sets includes at least one SRS resource.

The apparatus for switching an antenna switching configuration 800 can further include: a first determining module configured to determine, based on the first configuration information, one or more SRS resource sets corresponding to each of the one or more antenna switching configurations.

Optionally, the target SRS resource configuration is at least part of the SRS resources in one or more SRS resource sets corresponding to a reference antenna switching configuration of the terminal device. Where the reference antenna switching configuration includes an antenna switching configuration selected by the network device, or a highest antenna switching configuration corresponding to a highest capability supported by the terminal device.

Optionally, the receiving module 810 is further configured to receive high-level signaling carrying second configuration information sent by the network device, where the second configuration information is an SRS resource configuration corresponding to the reference antenna switching configuration, and the SRS resource configuration corresponding to the reference antenna switching configuration includes one or more SRS resource sets, each of which includes at least one SRS resource.

The apparatus for switching an antenna switching configuration 800 can further include:

a second determining module configured to determine, based on the second configuration information, the one or more SRS resource sets corresponding to the reference antenna switching configuration.

Optionally, the indication information is carried in the first medium access control (MAC) layer signaling. The apparatus for switching an antenna switching configuration 800 can further include: an activating module. The activating module is configured to, in response to the first MAC layer signaling, activate the target SRS resource configuration in one or more SRS resource configurations.

The first sending module is configured to send one or more semi-persistent SRS resource sets or one or more semi-persistent SRS resources in the target SRS resource configuration by adopting the target antenna switching configuration.

Optionally, the receiving module 810 is further configured to receive deactivation MAC layer signaling corresponding to the first MAC layer signaling and carrying the indication information.

The activating module is further configured to deactivate the one or more semi-persistent SRS resource sets or the one or more semi-persistent SRS resources in the target SRS resource configuration, and terminate the adopting of the target antenna switching configuration.

Optionally, the indication information is carried in downlink control information (DCI) signaling, and the apparatus for switching an antenna switching configuration 800 can further include a triggering module. The triggering module is configured to, in response to the DCI signaling, trigger the target SRS resource configuration in one or more SRS resource configurations.

The second sending module is configured to send one or more aperiodic SRS resource sets or one or more aperiodic SRS resources in the target SRS resource configuration by adopting the target antenna switching configuration.

Optionally, in the DCI signaling, the indication information is in a target indication field, where the target indication field is an extension of a bitwidth of an SRS resource indication (SRI) field, or an SRI field including bits that correspond to SRS resource sets.

Optionally, the receiving module 810 is further configured to receive second medium access control (MAC) layer signaling sent by the network device.

The apparatus for switching an antenna switching configuration 800 further includes: a responding module, configured to, in response to the second MAC layer signaling, activate an SRS resource configuration of the terminal device, which is the target SRS resource configuration.

Optionally, the receiving module 810 is further configured to receive deactivation MAC layer signaling corresponding to the second MAC layer signaling sent by the network device.

The apparatus for switching an antenna switching configuration 800 further includes a terminating module, configured to deactivate the one or more aperiodic SRS resource sets or the one or more aperiodic SRS resources in the target SRS resource configuration, and terminate the adopting of the target antenna switching configuration.

Optionally, the indication information is a resource identifier (ID) of the target SRS resource configuration; or, the indication information is a bitmap in which one or more bits corresponding to the target SRS resource configuration are enabled; or, the indication information is one or more codepoints corresponding to one or more SRS resource sets or an SRS resource combination in the target SRS resource configuration; where a corresponding relationship between the one or more SRS resource sets or the SRS resource combination and the one or more codepoints is configured and notified by the network device.

In the apparatus for switching an antenna switching configuration provided in the embodiments of the present disclosure, according to the target antenna switching configuration to which the terminal device is to switch on the current BWP, the network device sends the indication information for activating the corresponding target SRS resource configuration to the terminal device. So that after receiving the indication information of the target SRS resource configuration sent by the network device, based on the indication information of the target SRS resource configuration, the terminal device switches to the corresponding target antenna switching configuration on the current BWP. Therefore, switching of the antenna switching configuration of the terminal device on the current BWP can be realized without BWP switching or RRC reconfiguration, improving the switching flexibility of the antenna switching configuration and reducing the switching complexity.

In order to implement the above embodiments, the present disclosure also provides a communication device.

The communication device provided by the embodiment of the present disclosure includes a processor, a transceiver, a memory, and an executable program stored on the memory that can be run by the processor. When the processor runs the executable program, any of the aforementioned methods is performed. The communication device can be the aforementioned network device or terminal device.

The processor can include various types of storage media, which are non-temporary computer storage media that can continue to remember information stored on the communication device after a power failure. The communication device includes a base station or a terminal herein.

The processor can be connected to the memory through a bus or other means for reading the executable program stored on the memory, for example, at least one of which is shown in FIGS. 1 to 6.

In order to implement the above embodiments, the present disclosure also provides a computer storage medium. The computer storage medium provided in the embodiment of the present disclosure stores an executable program. After the executable program is executed by a processor, the aforementioned method can be implemented, for example, as shown in at least one of FIGS. 1 to 6.

Figure 9:
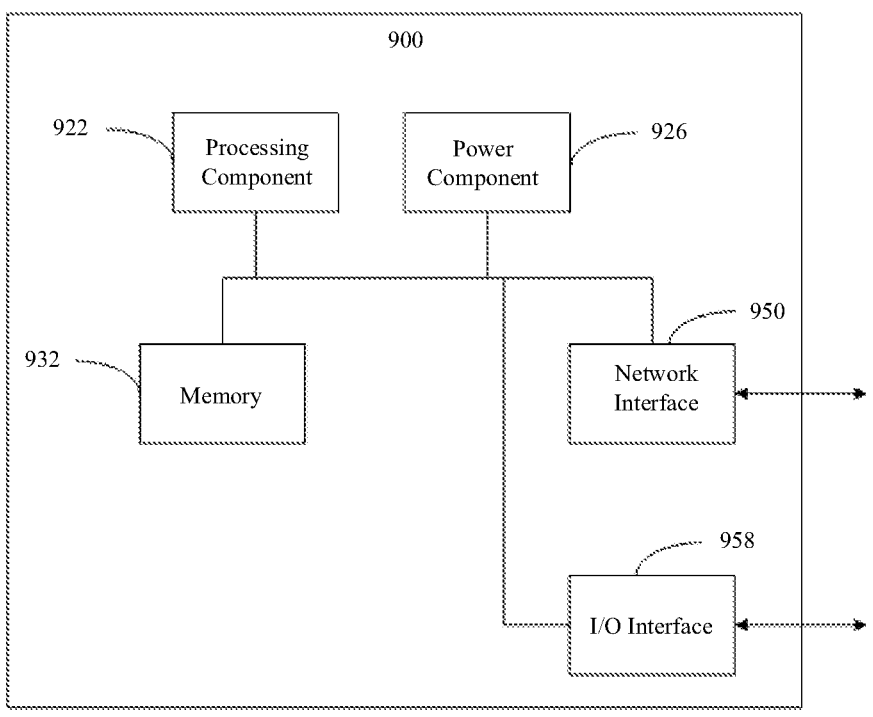
FIG. 9 is a schematic structural diagram illustrating a network device according to an embodiment of the present disclosure.

As shown, FIG. 9 is a block diagram illustrating a network device according to an embodiment of the present disclosure. Referring to FIG. 9, the network device 900 includes a processing component 922, which includes at least one processor, and a memory resource represented by a memory 932 for storing instructions executable by the processing component 922, such as application programs. The application program stored in the memory 932 may include one or more modules, each of which corresponds to a set of instructions. In addition, the processing component 922 is configured to execute instructions to perform the above method applied to the network device, for example, the method shown in FIGS. 4 to 6.

The network device 900 may also include a power component 926 configured to perform power management of the network device 900, a wired or wireless network interface 950 configured to connect the network device 900 to a network, and an input/output (I/O) interface 958. The network device 900 may operate based on an operating system stored on the memory 932, such as Windows Server™, Mac OS X™, Unix™, Linux™, FreeBSD™, or the like.

Figure 10:
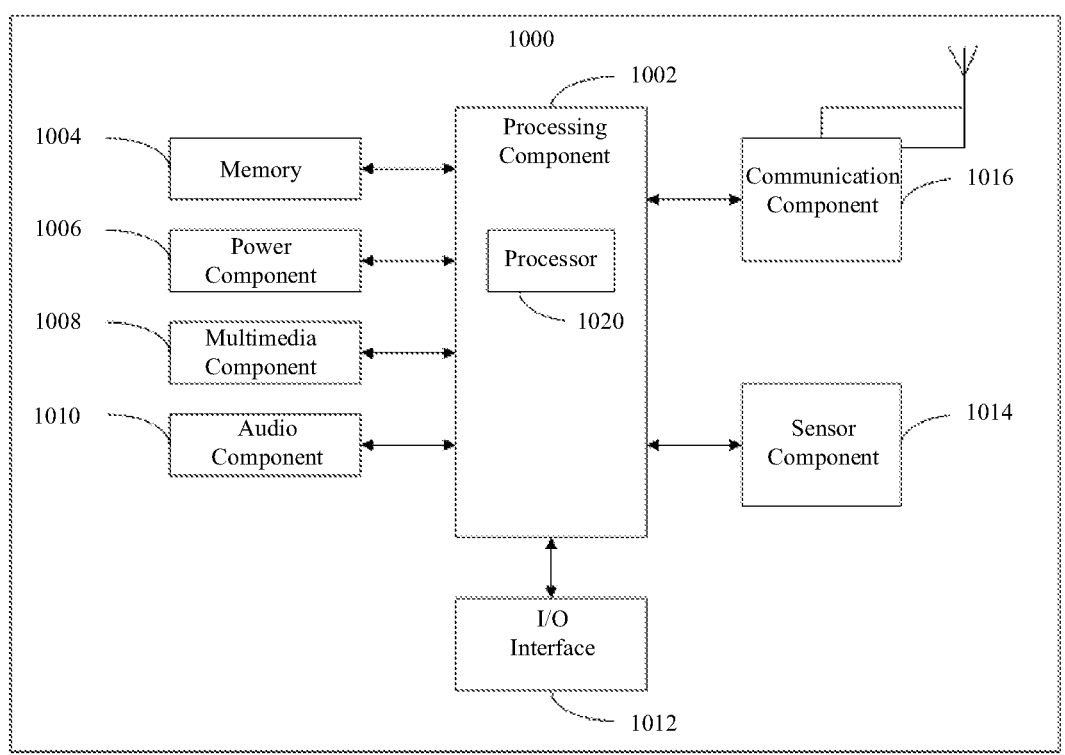
FIG. 10 is a block diagram illustrating a terminal device according to an embodiment of the present disclosure.

FIG. 10 is a block diagram illustrating a terminal device 1000 according to an embodiment of the present disclosure. For example, the terminal device 1000 may be a mobile phone, a computer, a digital broadcasting UE, a message transceiver device, a game console, a tablet device, a medical device, a fitness device, or a personal digital assistant.

As illustrated in FIG. 10, the terminal device 1000 may include one or more of the following components: a processing component 1002, a memory 1004, a power component 1006, a multimedia component 1008, an audio component 1010, an input/output (I/O) interface 1012, a sensor component 1014, and a communication component 1016.

The processing component 1002 typically controls overall operations of the terminal device 1000, such as the operations associated with display, telephone calls, data communications, camera operations, and recording operations. The processing component 1002 may include at least one processor 1020 to execute instructions, so as to perform all or part of the steps in the above-described method. Moreover, the processing component 1002 may include at least one module that facilitates the interaction between the processing component 1002 and other components. For example, the processing component 1002 may include a multimedia module to facilitate the interaction between the multimedia component 1008 and the processing component 1002.

The memory 1004 is configured to store various types of data to support the operation of the terminal device 1000. Examples of such data include instructions for any applications or methods operated on the terminal device 1000, contact data, phonebook data, messages, pictures, video, etc. The memory 1004 may be implemented using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a programmable read-only memory (PROM), a Read-Only Memory (ROM), a magnetic memory, a flash memory, a magnetic or optical disk.

The power component 1006 provides power to various components of the terminal device 1000. The power component 1006 may include a power management system, at least one power source, and any other components associated with the generation, management, and distribution of power in the terminal device 1000.

The multimedia component 1008 includes a screen providing an output interface between the terminal device 1000 and the user. In some embodiments, the screen may include a Liquid Crystal Display (LCD) and a Touch Panel (TP). If the screen includes the touch panel, the screen may be implemented as a touch screen to receive input signals from the user. The touch panel includes at least one touch sensor to sense touches, swipes, and gestures on the touch panel. The touch sensors may not only sense a boundary of a touch or swipe action, but also sense a wake-up time and a pressure associated with the touch or swipe action. In some embodiments, the multimedia component 1008 includes a front-facing camera and/or a rear-facing camera. When the terminal device 1000 is in an operating mode, such as a shooting mode or a video mode, the front-facing camera and/or the rear-facing camera can receive external multimedia data. Each front-facing camera and rear-facing camera may be a fixed optical lens system or have focal length and optical zoom capability.

The audio component 1010 is configured to output and/or input audio signals. For example, the audio component 1010 includes a microphone (MIC) configured to receive an external audio signal when the terminal device 1000 is in an operation mode, such as a call mode, a recording mode, and a voice recognition mode. The received audio signal may be further stored in the memory 1004 or transmitted via the communication component 1016. In some embodiments, the audio component 1010 further includes a speaker to output audio signals.

The I/O interface 1012 provides an interface between the processing component 1002 and peripheral interface modules, such as a keyboard, a click wheel, buttons, and the like. The buttons may include, but are not limited to, a home button, a volume button, a starting button, and a locking button.

The sensor component 1014 includes at least one sensor to provide status assessments of various aspects of the terminal device 1000. For instance, the sensor component 1014 may detect an open/closed status of the terminal device 1000, relative positioning of components, e.g., the display and the keypad, of the terminal device 1000, the sensor component 1014 may also detect a change in position of the terminal device 1000 or a component of the terminal device 1000, the presence or absence of contact between the user and terminal device 1000, an orientation or an acceleration/deceleration of the terminal device 1000, and a change in temperature of the terminal device 1000. The sensor component 1014 may include a proximity sensor configured to detect the presence of nearby objects without any physical contact. The sensor component 1014 may also include a light sensor, such as a CMOS or CCD image sensor, for use in imaging applications. In some embodiments, the sensor component 1014 may also include an accelerometer sensor, a gyroscope sensor, a magnetic sensor, a pressure sensor, or a temperature sensor.

The communication component 1016 is configured to facilitate communication, wired or wirelessly, between the terminal device 1000 and other devices. The terminal device 1000 can access a wireless network based on a communication standard, such as WiFi, 2G, or 3G, or a combination thereof. In an exemplary embodiment, the communication component 1016 receives a broadcast signal or broadcast-associated information from an external broadcast management system via a broadcast channel. In an exemplary embodiment, the communication component 1016 further includes a near field communication (NFC) module to facilitate short-range communication. For example, the NFC module may be implemented based on a radio frequency identity (RFID) technology, an infrared data association (IrDA) technology, an ultra-wideband (UWB) technology, a Bluetooth (BT) technology, and other technologies.

In exemplary embodiments, the terminal device 1000 may be implemented with at least one application specific integrated circuit (ASIC), digital signal processor (DSP), digital signal processing device (DSPD), programmable logic devices (PLD), field programmable gate arrays (FPGA), controller, micro-controller, microprocessor, or other electronic component, for performing the method shown in FIGS. 1 to 3 above.

In exemplary embodiments, there is also provided a non-transitory computer-readable storage medium including instructions, such as the memory 1004 including instructions, executable by the processor 1020 in the terminal device 1000 for performing the above method. For example, the non-transitory computer-readable storage medium may be a ROM, a RAM, a CD-ROM, a magnetic tape, a floppy disc, an optical data storage device, and the like.

Other embodiments of the present disclosure will be apparent to those skilled in the art from consideration of the specification and practice of the present disclosure disclosed herein. The present disclosure is intended to cover any variations, uses, or adaptations of the present disclosure following the general principles thereof and including common knowledge or common technical means in the technical field that are not disclosed in the present disclosure. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

According to an aspect of the embodiments of the present disclosure, there is provided a method for switching an antenna switching configuration, which is applied to a network device. The method includes: according to a target antenna switching configuration to which a terminal device is to switch on a current bandwidth part (BWP), sending indication information for activating a corresponding target sounding reference signal (SRS) resource configuration to the terminal device.

Optionally, the target SRS resource configuration is one or more SRS resource sets corresponding to the target antenna switching configuration to which the terminal device is to switch.

Optionally, the method further includes: for one or more antenna switching configurations supported by the terminal device, determining one or more SRS resource sets corresponding to each of the one or more antenna switching configurations; and sending high-level signaling carrying first configuration information to the terminal device, where the first configuration information is SRS resource configurations corresponding to the one or more antenna switching configurations, each of the SRS resource configurations includes the one or more SRS resource sets respectively, and each of the one or more SRS resource sets includes at least one SRS resource.

Optionally, the target SRS resource configuration is at least part of the SRS resources in one or more SRS resource sets corresponding to a reference antenna switching configuration of the terminal device, where the reference antenna switching configuration includes an antenna switching configuration selected by the network device, or a highest antenna switching configuration corresponding to a highest capability supported by the terminal device.

Optionally, the method further includes: determining the one or more SRS resource sets in an SRS resource configuration corresponding to the reference antenna switching configuration of the terminal device; sending high-level signaling carrying second configuration information to the terminal device, where the second configuration information is the SRS resource configuration corresponding to the reference antenna switching configuration, and the SRS resource configuration corresponding to the reference antenna switching configuration includes the one or more SRS resource sets, each of which includes at least one SRS resource.

Optionally, the indication information is carried in the first medium access control (MAC) layer signaling, where the first MAC layer signaling is configured to activate the target SRS resource configuration in one or more SRS resource configurations, so that the terminal device sends one or more semi-persistent SRS resource sets or one or more semi-persistent SRS resources by adopting the target SRS resource configuration.

Optionally, the method further includes: in response to termination of the adoption of the target antenna switching configuration by the terminal device, sending deactivation MAC layer signaling corresponding to the first MAC layer signaling and carrying the indication information to the terminal device.

Optionally, the indication information is carried in downlink control information (DCI) signaling, where the DCI signaling is configured to trigger the target SRS resource configuration in one or more SRS resource configurations for sending of one or more aperiodic SRS resource sets or one or more aperiodic SRS resources.

Optionally, in the DCI signaling, the indication information is in a target indication field, where the target indication field is an extension of a bitwidth of an SRS resource indication (SRI) field, or an SRI field including bits that correspond to SRS resource sets.

Optionally, the method further includes: sending second medium access control (MAC) layer signaling to the terminal device, where the second MAC layer signaling is configured to activate an SRS resource configuration of the terminal device, which is the target SRS resource configuration.

Optionally, after sending the second MAC layer signaling to the terminal device, the method further includes: in response to termination of the adoption of the SRS resource configuration by the terminal device, sending deactivation MAC layer signaling corresponding to the second MAC layer signaling to the terminal device.

Optionally, the indication information is a resource identifier (ID) of the target SRS resource configuration; or the indication information is a bitmap in which one or more bits corresponding to the target SRS resource configuration are enabled; or the indication information is one or more codepoints corresponding to one or more SRS resource sets or an SRS resource combination in the target SRS resource configuration; where a corresponding relationship between the one or more SRS resource sets or the SRS resource combination and the one or more codepoints is configured by the network device and notified to the terminal device.

According to an aspect of the embodiments of the present disclosure, there is provided another method for switching an antenna switching configuration, which is applied to a terminal device. The method includes: receiving indication information of a target sounding reference signal (SRS) resource configuration sent by a network device; and according to the indication information of the target SRS resource configuration, switching to a corresponding target antenna switching configuration on a current bandwidth part (BWP).

Optionally, the target SRS resource configuration is one or more SRS resource sets corresponding to the target antenna switching configuration to which the terminal device is to switch.

Optionally, the method further includes: receiving high-level signaling carrying first configuration information sent by the network device, where the first configuration information is SRS resource configurations corresponding to one or more antenna switching configurations supported by the terminal device, each of the SRS resource configurations includes one or more SRS resource sets, and each of the one or more SRS resource sets includes at least one SRS resource; and based on the first configuration information, determining one or more SRS resource sets corresponding to each of the one or more antenna switching configurations.

Optionally, the target SRS resource configuration is at least part of the SRS resources in one or more SRS resource sets corresponding to a reference antenna switching configuration of the terminal device, where the reference antenna switching configuration includes an antenna switching configuration selected by the network device, or a highest antenna switching configuration corresponding to a highest capability supported by the terminal device.

Optionally, the method further includes: receiving high-level signaling carrying second configuration information sent by the network device, where the second configuration information is an SRS resource configuration corresponding to the reference antenna switching configuration, and the SRS resource configuration corresponding to the reference antenna switching configuration includes one or more SRS resource sets, each of which includes at least one SRS resource; and based on the second configuration information, determining the one or more SRS resource sets corresponding to the reference antenna switching configuration.

Optionally, the indication information is carried in first medium access control (MAC) layer signaling; and the method further includes: in response to the first MAC layer signaling, activating the target SRS resource configuration in one or more SRS resource configurations; and sending one or more semi-persistent SRS resource sets or one or more semi-persistent SRS resources in the target SRS resource configuration by adopting the target antenna switching configuration.

Optionally, the method further includes: receiving deactivation MAC layer signaling corresponding to the first MAC layer signaling and carrying the indication information; and receiving deactivation MAC layer signaling corresponding to the first MAC layer signaling and carrying the indication information.

Optionally, the indication information is carried in downlink control information (DCI) signaling; and the method further includes: in response to the DCI signaling, triggering the target SRS resource configuration in one or more SRS resource configurations; and sending one or more aperiodic SRS resource sets or one or more aperiodic SRS resources in the target SRS resource configuration by adopting the target antenna switching configuration.

Optionally, in the DCI signaling, the indication information is in a target indication field, where the target indication field is an extension of a bitwidth of an SRS resource indication (SRI) field, or an SRI field including bits that correspond to SRS resource sets.

Optionally, the method further includes: receiving second medium access control (MAC) layer signaling sent by the network device; and in response to the second MAC layer signaling, activating an SRS resource configuration of the terminal device, which is the target SRS resource configuration.

Optionally, after sending the second MAC layer signaling to the terminal device, the method further includes: receiving deactivation MAC layer signaling corresponding to the second MAC layer signaling sent by the network device; and deactivating the one or more aperiodic SRS resource sets or the one or more aperiodic SRS resources in the target SRS resource configuration, and terminating the adopting of the target antenna switching configuration.

Optionally, the indication information is a resource identifier (ID) of the target SRS resource configuration; or, the indication information is a bitmap in which one or more bits corresponding to the target SRS resource configuration are enabled; or, the indication information is one or more codepoints corresponding to one or more SRS resource sets or an SRS resource combination in the target SRS resource configuration; where a corresponding relationship between the one or more SRS resource sets or the SRS resource combination and the one or more codepoints is configured and notified by the network device.

According to an aspect of the embodiments of the present disclosure, there is provided an apparatus for switching an antenna switching configuration, which is applied to a network device. The apparatus includes: a sending module, configured to send, according to a target antenna switching configuration to which a terminal device is to switch on a current bandwidth part (BWP), indication information for activating a corresponding target sounding reference signal (SRS) resource configuration to the terminal device.

Optionally, the target SRS resource configuration is one or more SRS resource sets corresponding to the target antenna switching configuration to which the terminal device is to switch.

Optionally, the apparatus includes a first determining module, configured to, for one or more antenna switching configurations supported by the terminal device, determine one or more SRS resource sets corresponding to each of the one or more antenna switching configurations; the sending module is further configured to send high-level signaling carrying first configuration information to the terminal device, where the first configuration information is SRS resource configurations corresponding to the one or more antenna switching configurations, each of the SRS resource configurations includes the one or more SRS resource sets respectively, and each of the one or more SRS resource sets includes at least one SRS resource.

Optionally, the target SRS resource configuration is at least part of the SRS resources in one or more SRS resource sets corresponding to a reference antenna switching configuration of the terminal device, where the reference antenna switching configuration includes an antenna switching configuration selected by the network device, or a highest antenna switching configuration corresponding to a highest capability supported by the terminal device.

Optionally, the apparatus includes a second determining module, configured to determine the one or more SRS resource sets in an SRS resource configuration corresponding to the reference antenna switching configuration of the terminal device; and the sending module is further configured to send high-level signaling carrying second configuration information to the terminal device, where the second configuration information is the SRS resource configuration corresponding to the reference antenna switching configuration, and the SRS resource configuration corresponding to the reference antenna switching configuration includes the one or more SRS resource sets, each of which includes at least one SRS resource.

Optionally, the indication information is carried in the first medium access control (MAC) layer signaling, where the first MAC layer signaling is configured to activate the target SRS resource configuration in one or more SRS resource configurations, so that the terminal device sends one or more semi-persistent SRS resource sets or one or more semi-persistent SRS resources by adopting the target SRS resource configuration.

Optionally, the sending module is further configured to, in response to termination of the adoption of the target antenna switching configuration by the terminal device, send deactivation MAC layer signaling corresponding to the first MAC layer signaling and carrying the indication information to the terminal device.

Optionally, the indication information is carried in downlink control information (DCI) signaling, where the DCI signaling is configured to trigger the target SRS resource configuration in one or more SRS resource configurations for sending of one or more aperiodic SRS resource sets or one or more aperiodic SRS resources.

Optionally, in the DCI signaling, the indication information is in a target indication field, where the target indication field is an extension of a bitwidth of an SRS resource indication (SRI) field, or an SRI field including bits that correspond to SRS resource sets.

Optionally, the sending module is further configured to send second medium access control (MAC) layer signaling to the terminal device, where the second MAC layer signaling is configured to activate an SRS resource configuration of the terminal device, which is the target SRS resource configuration.

Optionally, the sending module is further configured to, in response to termination of the adoption of the SRS resource configuration by the terminal device, send deactivation MAC layer signaling corresponding to the second MAC layer signaling to the terminal device.

Optionally, the indication information is a resource identifier (ID) of the target SRS resource configuration; or, the indication information is a bitmap in which one or more bits corresponding to the target SRS resource configuration are enabled; or, the indication information is one or more codepoints corresponding to one or more SRS resource sets or an SRS resource combination in the target SRS resource configuration; where a corresponding relationship between the one or more SRS resource sets or the SRS resource combination and the one or more codepoints is configured by the network device and notified to the terminal device.

the one or more SRS resource sets or the SRS resource combination and the one or more codepoints is configured by the network device and notified to the terminal device.

According to an aspect of the embodiments of the present disclosure, there is provided another apparatus for switching an antenna switching configuration, which is applied to a terminal device. The apparatus includes a receiving module, configured to receive indication information of a target sounding reference signal (SRS) resource configuration sent by a network device, and a switching module, configured to, according to the indication information of the target SRS resource configuration, switch to a corresponding target antenna switching configuration on a current bandwidth part (BWP).

Optionally, the target SRS resource configuration is one or more SRS resource sets corresponding to the target antenna switching configuration to which the terminal device is to switch.

Optionally, the receiving module is further configured to receive high-level signaling carrying first configuration information sent by the network device, where the first configuration information is SRS resource configurations corresponding to one or more antenna switching configurations supported by the terminal device, each of the SRS resource configurations includes one or more SRS resource sets, and each of the one or more SRS resource sets includes at least one SRS resource.

The apparatus further includes a first determining module configured to determine, based on the first configuration information, one or more SRS resource sets corresponding to each of the one or more antenna switching configurations.

Optionally, the target SRS resource configuration is at least part of the SRS resources in one or more SRS resource sets corresponding to a reference antenna switching configuration of the terminal device, where the reference antenna switching configuration includes an antenna switching configuration selected by the network device, or a highest antenna switching configuration corresponding to a highest capability supported by the terminal device.

Optionally, the receiving module is further configured to receive high-level signaling carrying second configuration information sent by the network device, where the second configuration information is an SRS resource configuration corresponding to the reference antenna switching configuration, and the SRS resource configuration corresponding to the reference antenna switching configuration includes one or more SRS resource sets, each of which includes at least one SRS resource.

The apparatus further includes a second determining module configured to determine, based on the second configuration information, the one or more SRS resource sets corresponding to the reference antenna switching configuration.

Optionally, the indication information is carried in first medium access control (MAC) layer signaling; and the apparatus further includes an activating module, configured to, in response to the first MAC layer signaling, activate the target SRS resource configuration in one or more SRS resource configurations; and the first sending module is configured to send one or more semi-persistent SRS resource sets or one or more semi-persistent SRS resources in the target SRS resource configuration by adopting the target antenna switching configuration.

Optionally, the receiving module is further configured to receive deactivation MAC layer signaling corresponding to the first MAC layer signaling and carrying the indication information; and the activating module is further configured to deactivate the one or more semi-persistent SRS resource sets or the one or more semi-persistent SRS resources in the target SRS resource configuration, and terminate the adopting of the target antenna switching configuration.

Optionally, the indication information is carried in downlink control information (DCI) signaling; and the apparatus further includes a triggering module, configured to, in response to the DCI signaling, trigger the target SRS resource configuration in one or more SRS resource configurations; and the second sending module is configured to send one or more aperiodic SRS resource sets or one or more aperiodic SRS resources in the target SRS resource configuration by adopting the target antenna switching configuration.

Optionally, in the DCI signaling, the indication information is in a target indication field, where the target indication field is an extension of a bitwidth of an SRS resource indication (SRI) field, or an SRI field including bits that correspond to SRS resource sets.

Optionally, the receiving module is further configured to receive second medium access control (MAC) layer signaling sent by the network device; and the apparatus further includes a responding module, configured to, in response to the second MAC layer signaling, activate an SRS resource configuration of the terminal device which is the target SRS resource configuration.

Optionally, the receiving module is further configured to receive deactivation MAC layer signaling corresponding to the second MAC layer signaling sent by the network device; and the apparatus further includes a terminating module, configured to deactivate the one or more aperiodic SRS resource sets or the one or more aperiodic SRS resources in the target SRS resource configuration, and terminate the adopting of the target antenna switching configuration.

Optionally, the indication information is a resource identifier (ID) of the target SRS resource configuration; or, the indication information is a bitmap in which one or more bits corresponding to the target SRS resource configuration are enabled; or, the indication information is one or more codepoints corresponding to one or more SRS resource sets or an SRS resource combination in the target SRS resource configuration; where a corresponding relationship between the one or more SRS resource sets or the SRS resource combination and the one or more codepoints is configured and notified by the network device.

According to an aspect of the embodiments of the present disclosure, there is provided a communication device, including a transceiver; a memory; and a processor that is connected to the transceiver and the memory, configured to control wireless signal transmission and reception of the transceiver by executing computer executable instructions on the memory, and can achieve the method for switching an antenna switching configuration provided in any one of the embodiments of the present disclosure.

According to an aspect of the embodiments of the present disclosure, there is provided a computer storage medium storing computer executable instructions, where after the computer executable instructions are executed by the processor, the method for switching an antenna switching configuration provided in any one of the embodiments of the present disclosure can be implemented.

According to an aspect of the embodiments of the present disclosure, there is provided a computer program product including a computer program, when executed by a processor in a communication device, the computer program implements the method for switching an antenna switching configuration provided in any one of the embodiments of the present disclosure.

In the methods, apparatuses for switching an antenna switching configuration, and a communication device provided in the embodiments of the present disclosure, according to the target antenna switching configuration to which the terminal device is to switch on the current BWP, the network device sends the indication information for activating the corresponding target SRS resource configuration to the terminal device, so that after receiving the indication information of the target SRS resource configuration sent by the network device, based on the indication information of the target SRS resource configuration, the terminal device switches to the corresponding target antenna switching configuration on the current BWP. Therefore, switching of the antenna switching configuration of the terminal device on the current BWP can be realized without BWP switching or RRC reconfiguration, improving the switching flexibility of the antenna switching configuration and reducing the switching complexity.

The invention claimed is:

1. A method for switching an antenna switching configuration, performed by a network device, the method comprising:

according to a target antenna switching configuration to which a terminal device is to switch on a current bandwidth part (BWP), sending indication information for activating a corresponding target sounding reference signal (SRS) resource configuration to the terminal device; wherein the indication information is carried in first medium access control (MAC) layer signaling, and the first MAC layer signaling is configured to activate the target SRS resource configuration in one or more SRS resource configurations, so that the terminal device sends one or more semi-persistent SRS resource sets or one or more semi-persistent SRS resources by adopting the target SRS resource configuration; and determining termination of adopting of the target antenna switching configuration by the terminal device, and sending deactivation MAC layer signaling corresponding to the first MAC layer signaling and carrying the indication information to the terminal device;

wherein the target SRS resource configuration is one or more SRS resource sets corresponding to the target antenna switching configuration to which the terminal device is to switch, and the method further comprises:

for one or more antenna switching configurations supported by the terminal device on the current BWP, determining one or more SRS resource sets corresponding to each of the one or more antenna switching configurations; and sending high-level signaling carrying first configuration information to the terminal device, wherein the first configuration information is SRS resource configurations corresponding to the one or more antenna switching configurations, each of the SRS resource configurations comprises one or more SRS resource sets, and each of the one or more SRS resource sets comprises at least one SRS resource;

or wherein the target SRS resource configuration is at least part of SRS resources in one or more SRS resource sets corresponding to a reference antenna switching configuration of the terminal device on the current BWP, wherein the reference antenna switching configuration comprises an antenna switching configuration selected by the network device, or a highest antenna switching configuration corresponding to a highest capability supported by the terminal device.

2. The method according to claim 1, wherein in a case where the target SRS resource configuration is the at least part of SRS resources in the one or more SRS resource sets corresponding to the reference antenna switching configuration of the terminal device on the current BWP, the method further comprises:

determining the one or more SRS resource sets in an SRS resource configuration corresponding to the reference antenna switching configuration of the terminal device on the current BWP; and sending high-level signaling carrying second configuration information to the terminal device, wherein the second configuration information is the SRS resource configuration corresponding to the reference antenna switching configuration, the SRS resource configuration corresponding to the reference antenna switching configuration comprises the one or more SRS resource sets, and each of the one or more SRS resource sets comprises at least one SRS resource.

3. The method according to claim 1, wherein the indication information is a resource identifier (ID) of the target SRS resource configuration; or the indication information is a bitmap in which one or more bits corresponding to the target SRS resource configuration are enabled; or the indication information is one or more codepoints corresponding to one or more SRS resource sets or an SRS resource combination in the target SRS resource configuration; wherein a corresponding relationship between the one or more SRS resource sets or the SRS resource combination and the one or more codepoints is configured by the network device and notified to the terminal device.

4. A non-transitory computer storage medium storing computer executable instructions; wherein after the computer executable instructions are executed by a processor, the method according to claim 1 is implemented.

5. The method according to claim 1, wherein the antenna switching configuration selected by the network device comprises an antenna switching configuration currently adopted by the terminal device.

6. The method according to claim 1, wherein the highest antenna switching configuration corresponding to the highest capability supported by the terminal device comprises an antenna switching configuration with both the largest number of reception antennas and the largest number of transmission antennas.

7. A method for switching an antenna switching configuration, performed by a terminal device, the method comprising:

receiving indication information of a target sounding reference signal (SRS) resource configuration sent by a network device; and according to the indication information of the target SRS resource configuration, switching to a corresponding target antenna switching configuration on a current bandwidth part (BWP);

wherein the indication information is carried in first medium access control (MAC) layer signaling, and the method further comprises:

activating the target SRS resource configuration in one or more SRS resource configurations;

sending one or more semi-persistent SRS resource sets or one or more semi-persistent SRS resources in the target SRS resource configuration by adopting the target antenna switching configuration;

receiving deactivation MAC layer signaling corresponding to the first MAC layer signaling and carrying the indication information; and deactivating the one or more semi-persistent SRS resource sets or the one or more semi-persistent SRS resources in the target SRS resource configuration, and terminating the adopting of the target antenna switching configuration;

wherein the target SRS resource configuration is one or more SRS resource sets corresponding to the target antenna switching configuration to which the terminal device is to switch, and the method further comprises:

receiving high-level signaling carrying first configuration information sent by the network device, wherein the first configuration information is SRS resource configurations corresponding to one or more antenna switching configurations supported by the terminal device, each of the SRS resource configurations comprises one or more SRS resource sets, and each of the one or more SRS resource sets comprises at least one SRS resource; and based on the first configuration information, determining one or more SRS resource sets corresponding to each of the one or more antenna switching configurations on the current BWP;

or wherein the target SRS resource configuration is at least part of SRS resources in one or more SRS resource sets corresponding to a reference antenna switching configuration of the terminal device on the current BWP, wherein the reference antenna switching configuration comprises an antenna switching configuration selected by the network device, or a highest antenna switching configuration corresponding to a highest capability supported by the terminal device.

8. The method according to claim 7, wherein in a case where the target SRS resource configuration is the at least part of SRS resources in the one or more SRS resource sets corresponding to the reference antenna switching configuration of the terminal device on the current BWP, the method further comprises:

receiving high-level signaling carrying second configuration information sent by the network device, wherein the second configuration information is an SRS resource configuration corresponding to the reference antenna switching configuration, the SRS resource configuration corresponding to the reference antenna switching configuration comprises one or more SRS resource sets, and each of the one or more SRS resource sets comprises at least one SRS resource; and based on the second configuration information, determining the one or more SRS resource sets corresponding to the reference antenna switching configuration on the current BWP.

9. The method according to claim 7, wherein the indication information is a resource identifier (ID) of the target SRS resource configuration; or the indication information is a bitmap in which one or more bits corresponding to the target SRS resource configuration are enabled; or the indication information is one or more codepoints corresponding to one or more SRS resource sets or an SRS resource combination in the target SRS resource configuration; wherein a corresponding relationship between the one or more SRS resource sets or the SRS resource combination and the one or more codepoints is configured and notified by the network device.

10. A communication device, comprising:

a transceiver;

a memory; and a processor, connected to the transceiver and the memory, configured to control wireless signal transmission and reception of the transceiver by executing computer executable instructions on the memory, and implement the method according to claim 7.

11. A non-transitory computer storage medium storing computer executable instructions; wherein after the computer executable instructions are executed by a processor, the method according to claim 7 is implemented.

12. The method according to claim 7, wherein the antenna switching configuration selected by the network device comprises an antenna switching configuration currently adopted by the terminal device.

13. The method according to claim 7, wherein the highest antenna switching configuration corresponding to the highest capability supported by the terminal device comprises an antenna switching configuration with both the largest number of reception antennas and the largest number of transmission antennas.

14. A communication device, comprising:

a transceiver;

a memory; and a processor, connected to the transceiver and the memory, configured to control wireless signal transmission and reception of the transceiver by executing computer executable instructions on the memory, and implement operations comprising:

according to a target antenna switching configuration to which a terminal device is to switch on a current bandwidth part (BWP), sending indication information for activating a corresponding target sounding reference signal (SRS) resource configuration to the terminal device; wherein the indication information is carried in first medium access control (MAC) layer signaling, and the first MAC layer signaling is configured to activate the target SRS resource configuration in one or more SRS resource configurations, so that the terminal device sends one or more semi-persistent SRS resource sets or one or more semi-persistent SRS resources by adopting the target SRS resource configuration; and determining termination of adopting of the target antenna switching configuration by the terminal device, and sending deactivation MAC layer signaling corresponding to the first MAC layer signaling and carrying the indication information to the terminal device;

wherein the target SRS resource configuration is one or more SRS resource sets corresponding to the target antenna switching configuration to which the terminal device is to switch, and when executing the computer executable instructions, the processor is caused to:

for one or more antenna switching configurations supported by the terminal device on the current BWP, determine one or more SRS resource sets corresponding to each of the one or more antenna switching configurations; and send high-level signaling carrying first configuration information to the terminal device, wherein the first configuration information is SRS resource configurations corresponding to the one or more antenna switching configurations, each of the SRS resource configurations comprises one or more SRS resource sets, and each of the one or more SRS resource sets comprises at least one SRS resource;

or wherein the target SRS resource configuration is at least part of SRS resources in one or more SRS resource sets corresponding to a reference antenna switching configuration of the terminal device on the current BWP, wherein the reference antenna switching configuration comprises an antenna switching configuration selected by the communication device, or a highest antenna switching configuration corresponding to a highest capability supported by the terminal device.

\* \* \* \* \*